United States Patent [19]
Uekusa

[11] Patent Number: 5,347,403
[45] Date of Patent: Sep. 13, 1994

[54] APPARATUS AND METHOD FOR RECORDING AND READING INFORMATION

[75] Inventor: Tadashi Uekusa, Kanagawa, Japan
[73] Assignee: Fuji Photo Film Co., Ltd., Kanagawa, Japan
[21] Appl. No.: 943,029
[22] Filed: Sep. 10, 1992
[30] Foreign Application Priority Data
Sep. 20, 1991 [JP] Japan .................................. 3-241349
Jun. 10, 1992 [JP] Japan .................................. 4-150792
[51] Int. Cl.$^5$ ........................ G03B 17/24; G11B 5/09; G11B 5/633
[52] U.S. Cl. ........................................ 360/3; 360/48; 354/105
[58] Field of Search ............... 360/1, 2, 3, 32, 47, 360/48; 354/105, 106, 109
[56] References Cited
U.S. PATENT DOCUMENTS 4,685,004 8/1987 Takahashi et al. ................... 360/48
5,204,708 4/1993 Whitfield et al. ................... 360/47

FOREIGN PATENT DOCUMENTS
WO904205 5/1990 World Int. Prop. O. .......... 358/302

*Primary Examiner*—Donald Hajec
*Assistant Examiner*—T. N. Forbus, Jr.
*Attorney, Agent, or Firm*—Sughrue, Mion, Zinn, Macpeak & Seas

[57] ABSTRACT

At least one of an error detection code for detecting an error in information to be recorded and an error correction code for correcting the error in the information is added to the information, and the information with at least one of the error detection code and the error correction code added thereto is recorded in a magnetic recording section provided in a photographic film. The information recorded in the magnetic recording section of the photographic film is read, and at least one of the detection of an information-reading failure and the correction of the error in the information is effected on the basis of at least one of the error detection code and the error correction code added to the information which has been read.

9 Claims, 18 Drawing Sheets

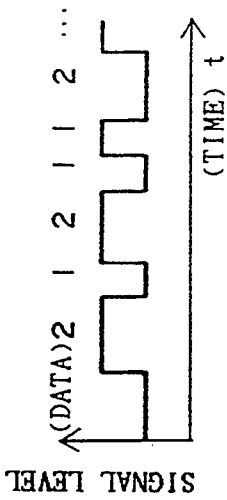
FIG. 11A ⟨DATA TO BE RECORDED⟩
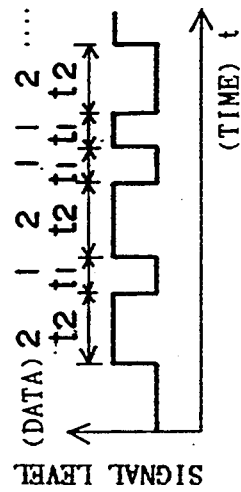
FIG. 11B
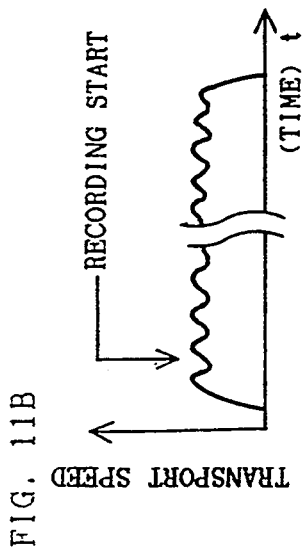
FIG. 11C RECORDED DATA
DURING RECORDING
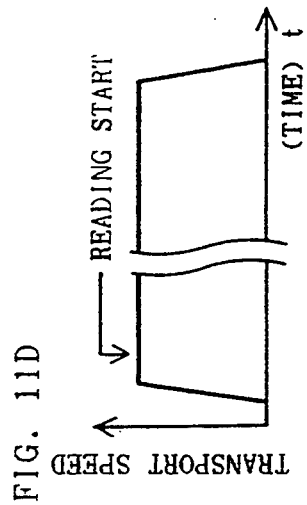
FIG. 11D
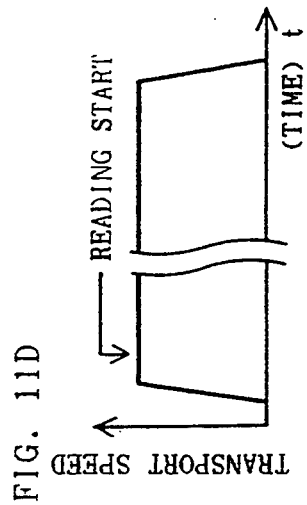
FIG. 11E DATA WHICH HAS BEEN READ
DURING READING
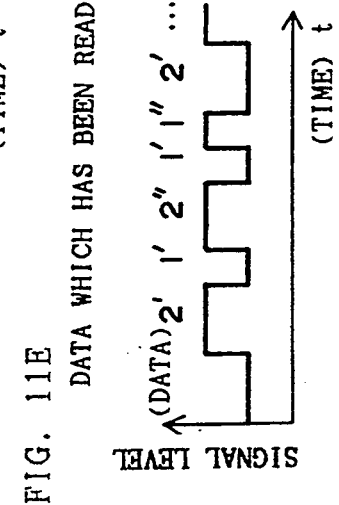
FIG. 11F ⟨DATA SUBJECTED TO ERROR CORRECTION/DETECTION⟩
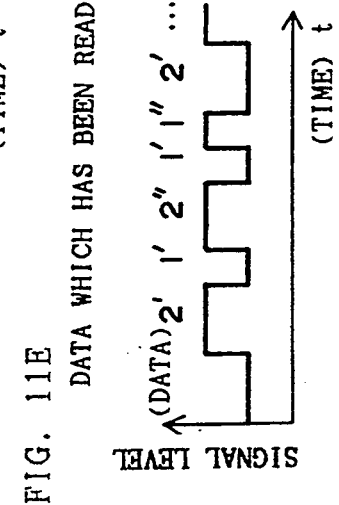
FIG. 11G
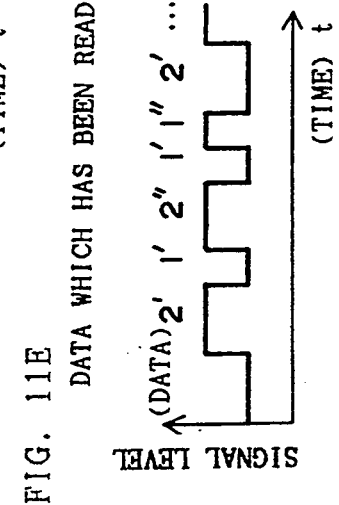
FIG. 11H ⟨RE-RECORDED DATA⟩
RE-RECORDING

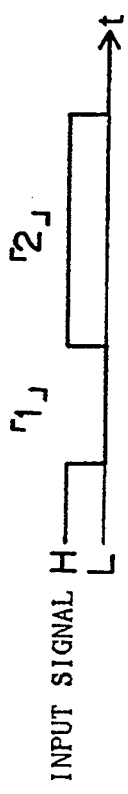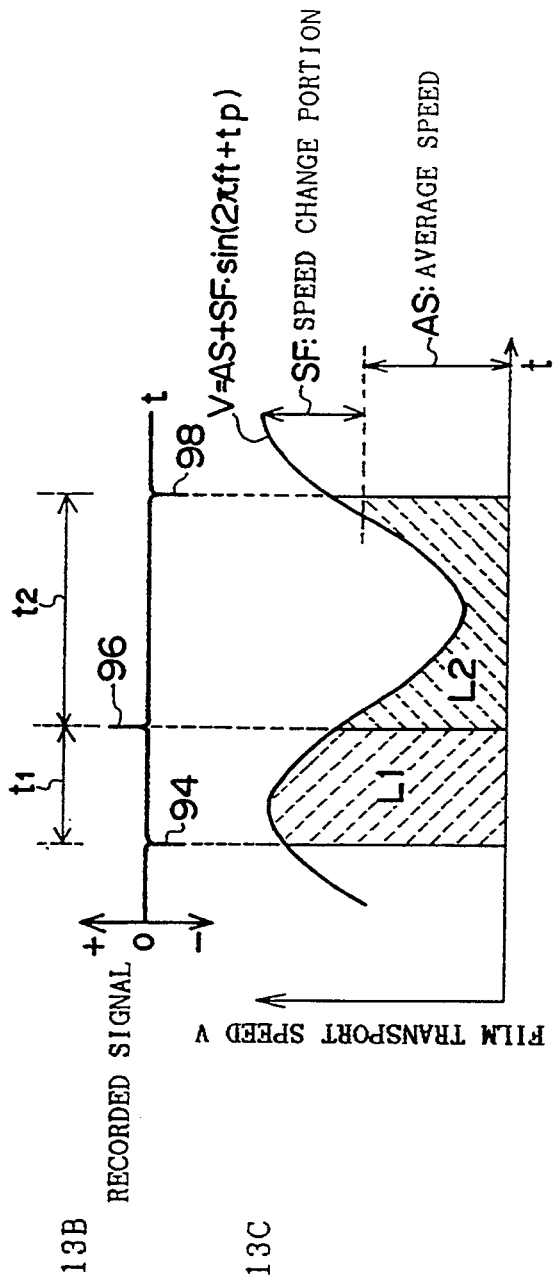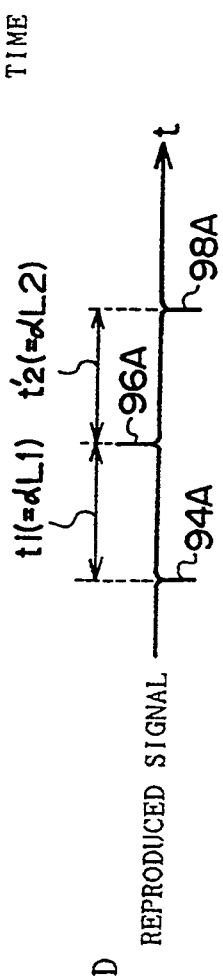
FIG. 13A INPUT SIGNAL
FIG. 13B RECORDED SIGNAL
FIG. 13C
FIG. 13D REPRODUCED SIGNAL

APPARATUS AND METHOD FOR RECORDING AND READING INFORMATION

BACKGROUND OF THE INVENTION

1. Field of the Invention

The present invention relates to an information recording apparatus for recording information in a magnetic recording section provided on a photographic film, an information reading apparatus for reading that information, and an information recording and reading method for recording information in the magnetic recording section and reading the information recorded.

2. Description of the Related Art

A technique has been proposed in which a photographic film, particularly a negative film, is coated with a transparent magnetic material, a magnetic recording section is formed along the traveling direction of the negative film, and information concerning the negative film and information concerning images printed on the negative film are recorded in the magnetic recording section (e.g. International Publication Number WO 90/04205). According to this technique, since information concerning images can be recorded in the magnetic recording section at positions physically corresponding to respective image frames in which the images have been recorded, the time and trouble involved in retrieval of information can be reduced. For instance, the date and time of photographing, a place of photographing, photographing conditions, and so on can be recorded at the time of photographing with the camera. In addition, at a laboratory (hereinafter referred to as the lab), corrected values of exposure conditions can be recorded in the magnetic recording section after checking the image frames with a notcher/puncher or the like, and the exposure conditions and the like of the respective image frames determined by taking into consideration the aforementioned photographing conditions and corrected values during printing onto a photographic paper using a printer can be recorded in the magnetic recording section. For this reason, at the time of a reordering, print processing can be effected under the same conditions if the exposure conditions and the like thus recorded are read.

When information magnetically recorded on a magnetic recording medium is read, there are cases where reading failures occur, including the loss of information (bit omission) due to the nonuniformity in the traveling speed of the magnetic recording medium, defects in the medium, dust, or the like, and a change in the content of information (transformation of bits) due to the inclusion of noise from an external source. To solve this problem, in such fields as digital audio, wireless communication, and computers, the following attempts are made to reduce the occurrence of reading failures such as those described above: That is, an attempt is made to control the nonuniformity in recording medium travel during the recording and reading of information to a fixed level or below by means of a PLL, clock detection or the like. At the time of recording information, verification is effected in which the information once recorded is read and a comparison is made between the same and the information persisting prior to the recording, or an error detection/correction typified by parity check is adopted.

Meanwhile, in the field of photographic processing, the recording and reading of information with respect to the magnetic recording section of a photographic film are handled by apparatuses whose photographic film transporting systems are provided with different configurations. For instance, the information is recorded by a camera and the information is read by a printer. As a result, the possibility of occurrence of the aforementioned reading failures is high. In the field of photographic processing, there has been no prior art in which the above-described error detection and correction technique is applied to the information recorded in the magnetic recording section of a photographic film. Therefore, in the event that a reading failure has occurred and resulted in the loss of information or a change in its content, problems are encountered by the reading apparatus, which is operated on the basis of the information which has been read. In addition, in the event that a synchronization error occurs due to the fact that the clock cannot be detected during reading or for another similar reason, there occurs a so-called burst error in which consecutive bits of information recorded in the magnetic recording section are lost or transformed in large volumes, in which case the detrimental effect is particularly large.

In addition, particularly in a camera, the variation of the film advancing speed occurs frequently as it is affected by, among other things, fluctuations in the voltage of a battery serving as a power source for a film-transporting motor, and fluctuations in the torque for withdrawing the photographic film from a cartridge. Furthermore, cameras are used by general users and could be placed under various environments unsuitable for information recording, e.g., a high- or low-temperature environment, a high-humidity environment, and an environment in which the cameras are subjected to vibrations or dust enters the same. For this reason, even if information is simply recorded in the magnetic recording section of the photographic film, reading failures can possibly occur or the contents of the information may change due to the variations in the film advancing speed during information recording or the effect of the surrounding environment. Hence, the reliability of the recording information is low.

To prevent a decline in the reliability of recording information due to the variation of the advancing speed, it is conceivable to provide the camera with a device which has a read head for reading the information recorded in the magnetic recording section and which is adapted to effect the aforementioned verification. Such an arrangement, however, causes the camera to become large in size and heavy in weight. Since the camera is premised on an assumption that it is carried by the user, it is undesirable that the camera becomes large in size and heavy in weight. Thus, it has been difficult for the camera to be provided with the device for improving the reliability of recording information.

SUMMARY OF THE INVENTION

In view of the above-described circumstances, it is an object of the present invention to provide an information recording apparatus capable of reducing the occurrence of trouble caused by a reading failure.

It is another object of the present invention to provide an information reading apparatus capable of reducing the occurrence of trouble caused by a reading failure.

It is still another object of the present invention to provide a method of recording and reading information which is capable of reducing the occurrence of trouble caused by a reading failure.

An information recording apparatus in accordance with a first aspect of the invention comprises: adding means for adding to information to be recorded at least one of an error detection code for detecting an error in the information and an error correction code for correcting the error in the information; and recording means for recording in a magnetic recording section of a photographic film the information to which at least one of the error detection code and the error correction code is added by the adding means.

An information reading apparatus in accordance with a second aspect of the invention comprises: reading means for reading information to which at least one of an error detection code and an error correction code has been added, and which has been recorded in a magnetic recording section of a photographic film; and error detecting means for effecting at least one of the detection of an information-reading failure and the correction of the error in the information on the basis of at least one of the error detection code and the error correction code added to the information which has been read by the reading means.

A method of recording and reading information in accordance with a third aspect of the invention comprises the steps of: recording, in a magnetic recording section of a photographic film being transported, information to which at least one of an error detection code and an error correction code has been added; reading the information which has been recorded in the magnetic recording section and to which at least one of the error detection code and the error correction code has been added, while the photographic film is being transported at a substantially fixed transport speed; and effecting at least one of the detection of the error in the information which has been read and the correction of the error on the basis of at least one of the error detection code and the error correction code.

A method of recording and reading information in accordance with a fourth aspect of the invention comprises the steps of: recording, in a magnetic recording section of a photographic film being transported, information to which at least one of an error detection code and an error correction code has been added; reading the information which has been recorded in the magnetic recording section and to which at least one of the error detection code and the error correction code has been added, while the photographic film is being transported at a substantially fixed transport speed; effecting at least one of the detection of the error in the information which has been read and the correction of the error on the basis of at least one of the error detection code and the error correction code; and recording again in the magnetic recording section the information which has been subjected to at least one of the error detection and the error correction or information which has been obtained on the basis of that information, while the photographic film is being transported at a substantially fixed transport speed.

A method of recording and reading information according to a fifth aspect of the invention comprises the steps of: recording, in a magnetic recording section of a photographic film being transported after being loaded in a camera, information to which at least one of an error detection code and an error correction code has been added; reading the information which has been recorded in the magnetic recording section and to which at least one of the error detection code and the error correction code has been added, while the photographic film is being transported at a substantially fixed transport speed in a photographic processor; effecting at least one of the detection of the error in the information which has been read and the correction of the error on the basis of at least one of the error detection code and the error correction code; and recording again in the magnetic recording section the information which has been subjected to at least one of the error detection and the error correction or information which has been obtained on the basis of that information, while the photographic film is being transported at a substantially fixed transport speed in the photographic processor.

In the first aspect of the invention, an error detection code and/or an error correction code is added to the information to be recorded, and the information is recorded in a magnetic recording section of a photographic film. As a result, even in a case where a reading failure occurs when the information recorded in the magnetic recording section is read, a missing portion of the information or a portion whose content has changed can be detected and/or corrected by the error detection code and/or the error correction code. Hence, it is possible to reduce the occurrence of trouble caused by a reading failure. As the error detection code, it is possible to use CRC (cyclic redundancy check), for instance. In addition, as the error correction code, it is possible to use an RS (Reed-Solomon) code, for instance. This information recording apparatus can be installed in a camera, a printer or other similar apparatus for recording information in the magnetic recording section of the photographic film.

In the second aspect of the invention, information with at least one of the error detection code and the error correction code added thereto is read from the magnetic recording section of the photographic film, and at least one of the detection of an information-reading failure and the correction of the error in the information is effected on the basis of at least one of the error detection code and the error correction code. As a result, when an information-reading failure has occurred, a missing portion or a portion whose content has changed can be detected and/or corrected, so that it is possible to reduce the occurrence of trouble caused by a reading failure. As the error detection code and the error correction code, it is possible to use the same codes as mentioned above. This information reading apparatus can be installed in a reading apparatus within a camera, a printer, a collating device for effecting collation between a photographic film and a print, or other similar apparatus for reading information recorded in the magnetic recording section of the photographic film.

In the third aspect of the invention, when information is recorded in the magnetic recording section in a state in which the transport speed of a photographic film being transported varies as in an advancing operation in a camera, and the recorded information is read, the information is recorded with at least one of the error detection code and the error correction code added thereto. The information with at least one of the error detection code and the error correction code added thereto is read while the photographic film is being transported at a substantially fixed transport speed. Then, at least one of the detection of the information error and the correction of the information error is performed on the basis of at least one of the error detection code and the error correction code. Thus, since the information is read while the photographic film is being transported at a substantially fixed transport speed, and at least one of the error detection and the error correction is performed, it is possible to reduce the occurrence of trouble caused by a reading failure. In addition, it is unnecessary to newly install, for instance, a device having a read head and adapted to effect processing such as verification so as to improve the reliability of recording information when the information is recorded. In a case where information is recorded in the magnetic recording section in a camera, for instance, the camera can be constructed with a compact size and light weight.

In the fourth aspect of the invention, in the same way as in the third aspect of the invention, information with at least one of the error detection code and the error correction code added thereto is recorded in the magnetic recording section of the photographic film being transported. The information which has been read while the photographic film is being transported at a substantially fixed transport speed is subjected to at least one of error detection and error correction on the basis of at least one of the error detection code and the error correction code. The information subjected to at least one of the error detection and the error correction or information obtained on the basis of that information is recorded again in the magnetic recording section while the photographic film is being transported at a substantially fixed transport speed. Thus, since the information is recorded again in a relatively stable condition in which the photographic film is being transported at a substantially fixed transport speed after the error detection and/or error correction is performed, when the information is read again in a process downstream of photographic processing, the possibility of the occurrence of trouble caused by a reading failure is further reduced.

In the fifth aspect of the invention, information with at least one of the error detection code and the error correction code added thereto is recorded in the magnetic recording section of the photographic film being transported after being loaded in a camera, and the information is read while the photographic film is being transported at a substantially fixed transport speed in a photographic processor. Although the reliability of the recording information in a camera is low due to the variations in the film advancing speed during information recording or the effect of the surrounding environment, as described above, the photographic processor is generally installed indoors. Hence, the surrounding environment is stable, and since a high-performance film advancing motor can be used, the photographic film can be transported at a substantially fixed transport speed. In addition, since at least one of the detection and correction of an error in the information read on the basis of at least the error detection code and the error correction code is effected, it is possible to reduce the occurrence of trouble resulting from the fact that a portion of the information recorded in the magnetic recording section undergoes a reading failure in the photographic processor. In addition, since the information subjected to at least one of the error detection and the error correction or information obtained on the basis of that information is recorded again in the magnetic recording section while the photographic film is being transported at a substantially fixed transport speed in the photographic processor, when the information is read again in a process downstream of photographic processing, the occurrence of trouble due to a reading failure is practically nil.

In the fourth and fifth aspects of the invention, the information to be re-recorded may be the information subjected to at least one of the error detection and correction, or information obtained on the basis of that information, such as information indicating exposure conditions determined on the basis of photographing information recorded in the camera, or both. In addition, since cases where the re-recorded information undergoes a reading failure are practically nil, the error detection code, the error correction code or the like may not be added. If the error detection code, the error correction code or the like is not added, other information of a size corresponding to the error detection code, the error correction code or the like can be recorded in the magnetic recording section. Hence, effective use can be made of the magnetic recording section.

As described above, in accordance with the first aspect of the invention, since at least one of the information error detection code and the error correction code is added to the information to be recorded, and the information is recorded in the magnetic recording section of the photographic film, it is possible to obtain an outstanding advantage in that the occurrence of trouble caused by a reading failure can be reduced.

In accordance with the second aspect of the invention, since the information recorded in the magnetic recording section of the photographic film is read, and at least one of the reading error detection and correction of the information is performed on the basis of at least the error detection code and the error correction code added to that information, it is possible to obtain an outstanding advantage in that the occurrence of trouble caused by a reading failure can be reduced.

In accordance with the third aspect of the invention, the arrangement provided is such that information with at least one of the error detection code and the error correction code added thereto is recorded in the magnetic recording section of the photographic film being transported; the information is read while the photographic film is being transported at a substantially fixed transport speed; and at least one of the error detection and correction of the information read on the basis of at least one of the error detection code and the error correction code is performed. Therefore, it is possible to obtain an outstanding advantage in that the occurrence of trouble caused by a reading failure of information recorded in a state in which the transport speed varies can be reduced.

In accordance with the fourth aspect of the invention, the arrangement provided is such that information with at least one of the error detection code and the error correction code added thereto is recorded in the magnetic recording section of the photographic film being transported; the information is read while the photographic film is being transported at a substantially fixed transport speed; at least one of the error detection and correction of the information read on the basis of at least one of the error detection code and the error correction code is performed; and the information subjected to at least one of the error detection and the error correction or information obtained on the basis of that information is recorded again in the magnetic recording section while the photographic film is being transported at a substantially fixed transport speed. Therefore, it is possible to obtain an outstanding advantage in that the occurrence of trouble caused by a reading failure of information recorded in a state in which the transport speed varies can be reduced.

In accordance with the fifth aspect of the invention, the arrangement provided is such that information with at least one of the error detection code and the error correction code added thereto is recorded in the magnetic recording section of the photographic film being transported after being loaded in a camera; the information is read while the photographic film is being transported at a substantially fixed transport speed in the photographic processor; at least one of the detection and correction of an error in the information read on the basis of at least the error detection code and the error correction code is effected; and the information subjected to at least one of the error detection and the error correction or information obtained on the basis of that information is recorded again in the magnetic recording section while the photographic film is being transported at a substantially fixed transport speed in the photographic processor. Therefore, it is possible to obtain an outstanding advantage in that the occurrence of trouble caused by a reading failure can be reduced.

The other objects, features and advantages of the present invention will become more apparent from the following detailed description of the invention when read in conjunction with the accompanying drawings.

BRIEF DESCRIPTION OF THE DRAWINGS

FIGS. 11A to 11H are diagrams illustrating a signal and a change in the transport speed, in which FIGS. 11A to 11C show those during information recording; FIGS. 11D and 11E, those during information reading; and FIGS. 11F to 11H, those during information re-recording;

FIGS. 13A to 13D are diagrams illustrating an input signal, a recorded signal by a magnetic head, and a film transport speed, respectively, during information recording, while FIG. 13C is a diagram illustrating a reproduced signal at a time when the information is read;

DESCRIPTION OF THE PREFERRED EMBODIMENTS

[First Embodiment]

Figure 1:
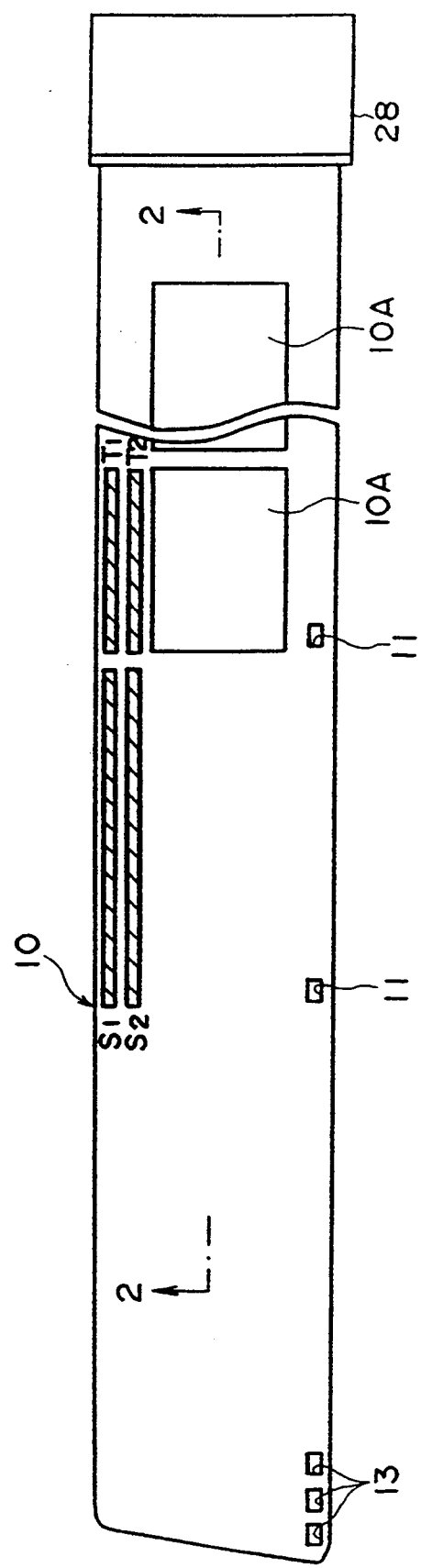
FIG. 1 is a plan view of a negative film.
Figure 2:
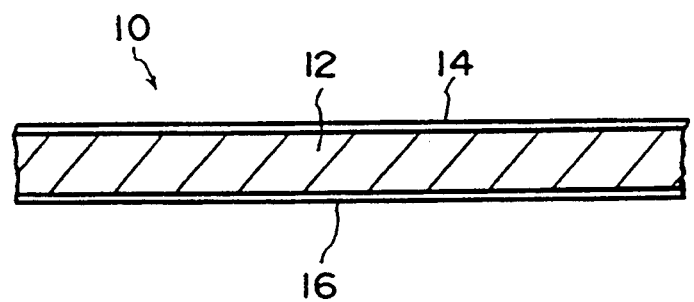
FIG. 2 is a cross-sectional view of the negative film taken along line 2—2 of FIG. 1.

Referring now to the accompanying drawings, a detailed description will be given of a first embodiment of the present invention. FIGS. 1 and 2 show a negative film 10 in accordance with the first embodiment. The negative film 10 has an emulsion layer 14 provided on an upper surface of a transparent base 12 (FIG. 2), and an image is adapted to be exposed and recorded on the emulsion layer 14. A magnetic recording layer 16 consisting of a transparent magnetic material is provided on a lower surface of the transparent base 12. This magnetic recording layer 16 is coated on the entire surface of the negative film 10. Recording tracks include tracks S1 and S2 provided in the vicinity of a side of the film 10 at a leading end portion thereof where image frames 10A are not formed, as well as tracks T1 and T2 provided in the vicinity of the side of the film 10 in correspondence with each image frame 10A. It should be noted that the magnetic recording layer 16 can be formed of an ordinary translucent magnetic material, in which case the magnetic recording layer is formed in portions other than those where the image frames are formed.

The tracks S1 and S2 are areas for recording necessary information relating to each roll of negative film 10, such as information specifying the user of the negative film 10. Meanwhile, the tracks T1 and T2 are areas for recording necessary information on each image frame 10A, such as information indicating the photographing conditions of each image frame 10A and user's information on each image frame. A clock signal is magnetically recorded at a leading and a trailing end of each track at a manufacturing stage of the film, the clock signal being prepared so that a pulse train signal consisting of consecutive pulses of a fixed period will be reproduced. This clock signal is used for detecting the advancing speed of the negative film 10 when the information is recorded on each track or read from each track.

Perforations 11 are provided on one side of the negative film 10 where the tracks are not formed, at positions respectively corresponding to the position of the leading ends of the tracks S1 and S2 and the leading ends of the tracks T1 and T2. In addition, a plurality of perforations 13 are provided at the leading end of the negative film 10 for drawing out the film 10 by allowing teeth of an unillustrated sprocket to engage the same.

Figure 3:
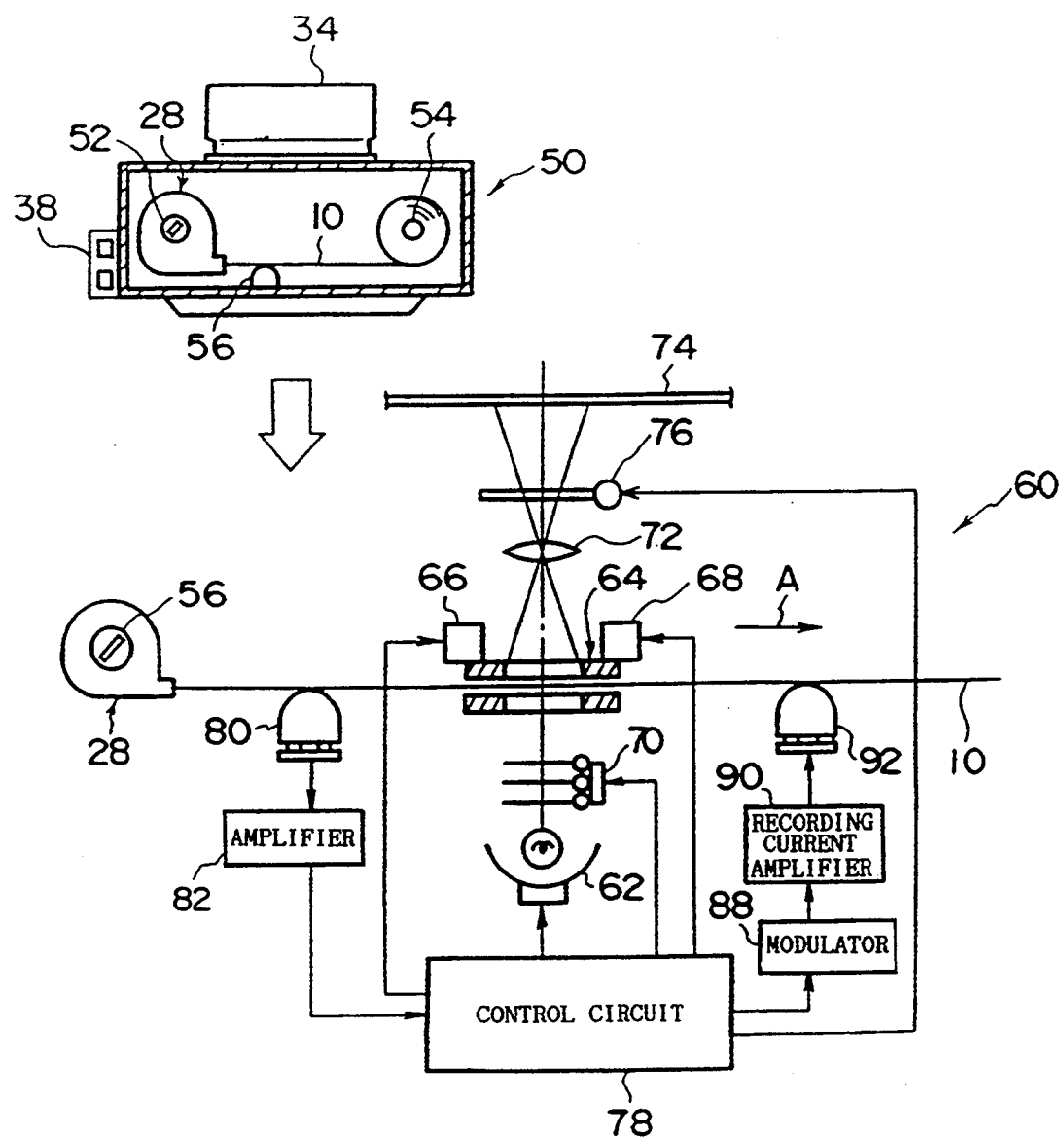
FIG. 3 is a schematic diagram of a photographic processing system.
Figure 4:
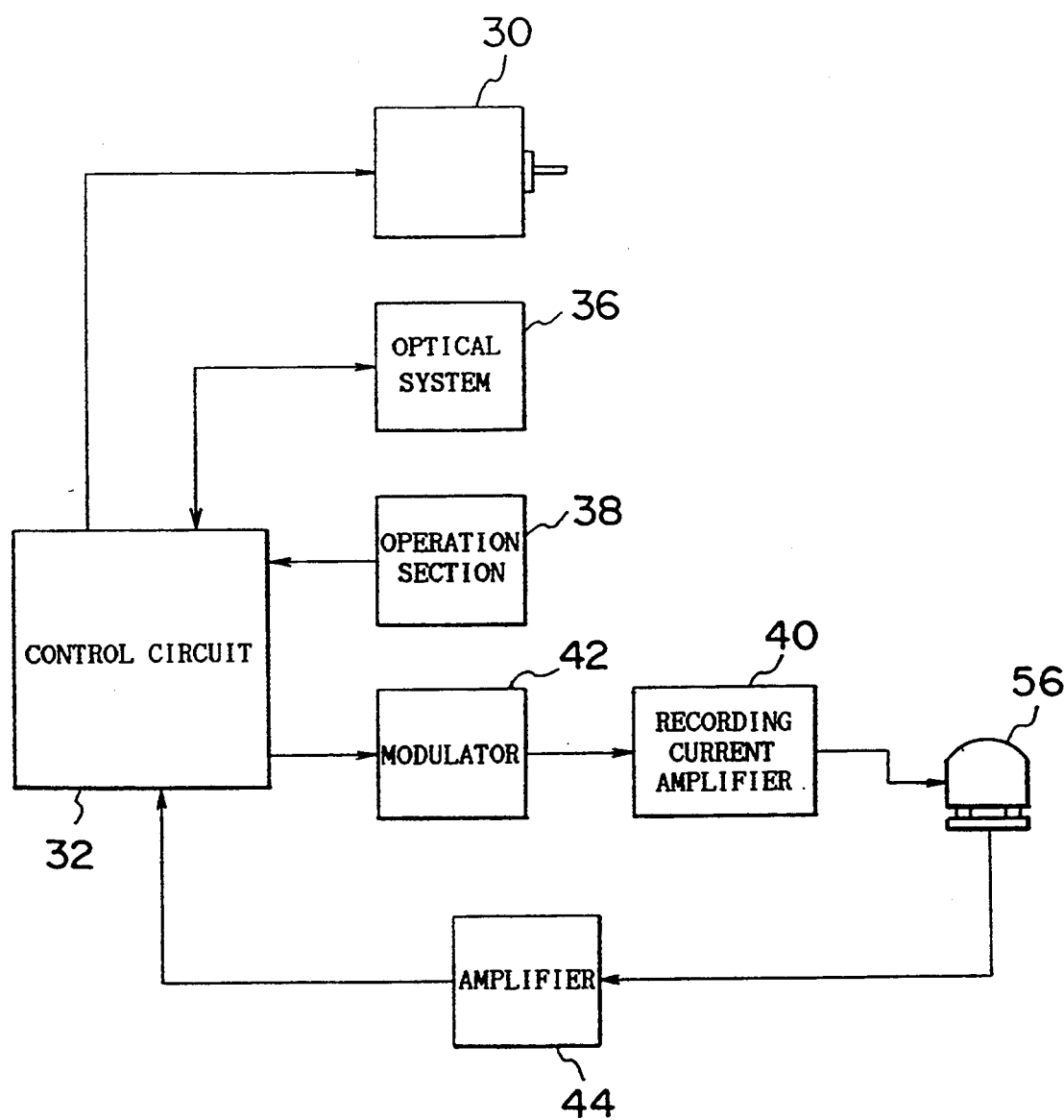
FIG. 4 is a block diagram illustrating a schematic configuration of a camera.

FIG. 3 shows a photographic processing system which includes a camera 50 corresponding to an information recording apparatus of the present invention and a photographic printer 60 corresponding to an information reading apparatus of the present invention. The camera 50 is loaded on one side thereof with a cartridge 28 for accommodating the negative film 10 therein by winding the same onto a spool 52. The camera 50 is provided with a drive reel 54 which is driven by a motor 30 (see FIG. 4). The negative film 10 is advanced with its leading end retained by the drive reel 54, and an image is photographed thereon. The negative film 10 for which the photographing of a predetermined number of frames has been completed is rewound by the spool 52 in the cartridge 28. As shown in FIG. 4, the motor 30 is electrically connected to a control circuit 32, and its operation is controlled by the control circuit 32.

In addition, a driving unit of an optical system 36, which comprises a lens 34 (see FIG. 3), an unillustrated shutter and the like, is electrically connected to the control circuit 32 to record an image on the negative film 10 by controlling the operation of the optical system 36. In addition, information which specifies various photographing conditions for each image frame 10A, including an aspect ratio of the image frame 10A recorded on the negative film 10, an exposure at the time of photographing, and light source information, is inputted to the control system 32 from the optical system 36 after the photographing of each image frame 10A. In addition, an operation section 38 is provided on the camera 50. Information specifying the user such as a user ID, name and address, as well as user's information on each image frame 10A such as a title, keyword, place of photographing, is manually inputted through the operation section 38.

A magnetic head 56 is provided in the camera 50 in correspondence with the tracks of the magnetic recording layer 16 of the negative film 10. The magnetic head 56 is electrically connected to the control circuit 32 via a recording current amplifier 40 and a modulator 42. The control circuit 32 edits the information (binary data) inputted through the optical system 36 and the operation section 38 into data (424 bits) for each track in accordance with a predetermined format, and adds error detection and error correction codes, which will be described later, to provide data of 600 bits (=150 bytes, where 1 byte=4 bits). The control circuit 32 rearranges this data in accordance with an interleaving method, which will be described later, and outputs the same to the modulator 42 when the negative film 10 is advanced by the motor 30. The modulator 42 converts the inputted data to a write signal for magnetic recording. As this write signal is amplified by the recording current amplifier 40 and is supplied to the magnetic head 56, the aforementioned information is recorded in each track. In addition, the signal (information) read by the magnetic head 56 is amplified by an amplifier 44 and is then inputted to the control circuit 32.

After the negative film 10 for which photographing has been completed is rewound back into the cartridge 28, the negative film 10 is removed from the camera 50 and is brought to the lab. At the lab, the negative film 10 is subjected to development, fixing, washing, and dry processing by an unillustrated developing apparatus, and is then set in the photographic printer 60.

The photographic printer 60 has a negative carrier 64 disposed on an optical axis of a light source 62. The negative carrier 64 is provided with a drive roller (not shown) which is rotated by a driving force of a drive unit 66, so that the negative film 10 is transported by the drive roller in the direction of arrow A in FIG. 3. In addition, the negative carrier 64 is provided with a solenoid 68. A clamping portion of the solenoid 68 is actuated in response to an instruction from a control circuit 78 to secure the negative film 10 at a printing position in a clamped state.

C, M, and Y filters 70 are interposed between the light source 62 and the negative carrier 64, and are controlled by the control circuit 78 so as to be brought into or out of the optical axis in response to an exposure of each color. The rays of light transmitted through the negative film 10 are applied to printing paper 74 via a lens 72, thereby allowing an image to be printed onto the printing paper 74. It should be noted that a shutter 76 is interposed between the printing paper 74 and the lens 72, and is arranged to retract from the optical axis during exposure by means of an instruction from the control circuit 78. A read head 80 is disposed upstream of the negative carrier 64 in the transport passage of the negative film 10, and is adapted to read information magnetically recorded in the tracks by the magnetic head 56 of the camera 50. An output terminal of the read head 80 is electrically connected to an amplifier 82, which amplifies a weak signal outputted from the read head 80 and outputs the same. An output terminal of the amplifier 82 is electrically connected to the control circuit 78.

A recording head 92 for magnetically recording information in each track of the magnetic recording layer 16 is disposed downstream of the negative carrier 64. The control circuit 78 edits data indicating the exposure conditions and the like used when print processing was effected by the photographic printer 60, and outputs the same to a modulator 88. In the same way as the modulator 42, the modulator 88 converts the binary data expressed by "10 . . ." or the like inputted from the control circuit 78 into a write signal, and outputs the write signal to a recording current amplifier 90. The recording current amplifier 90 amplifies the write signal and supplies the same to the recording head 92.

Figure 5:
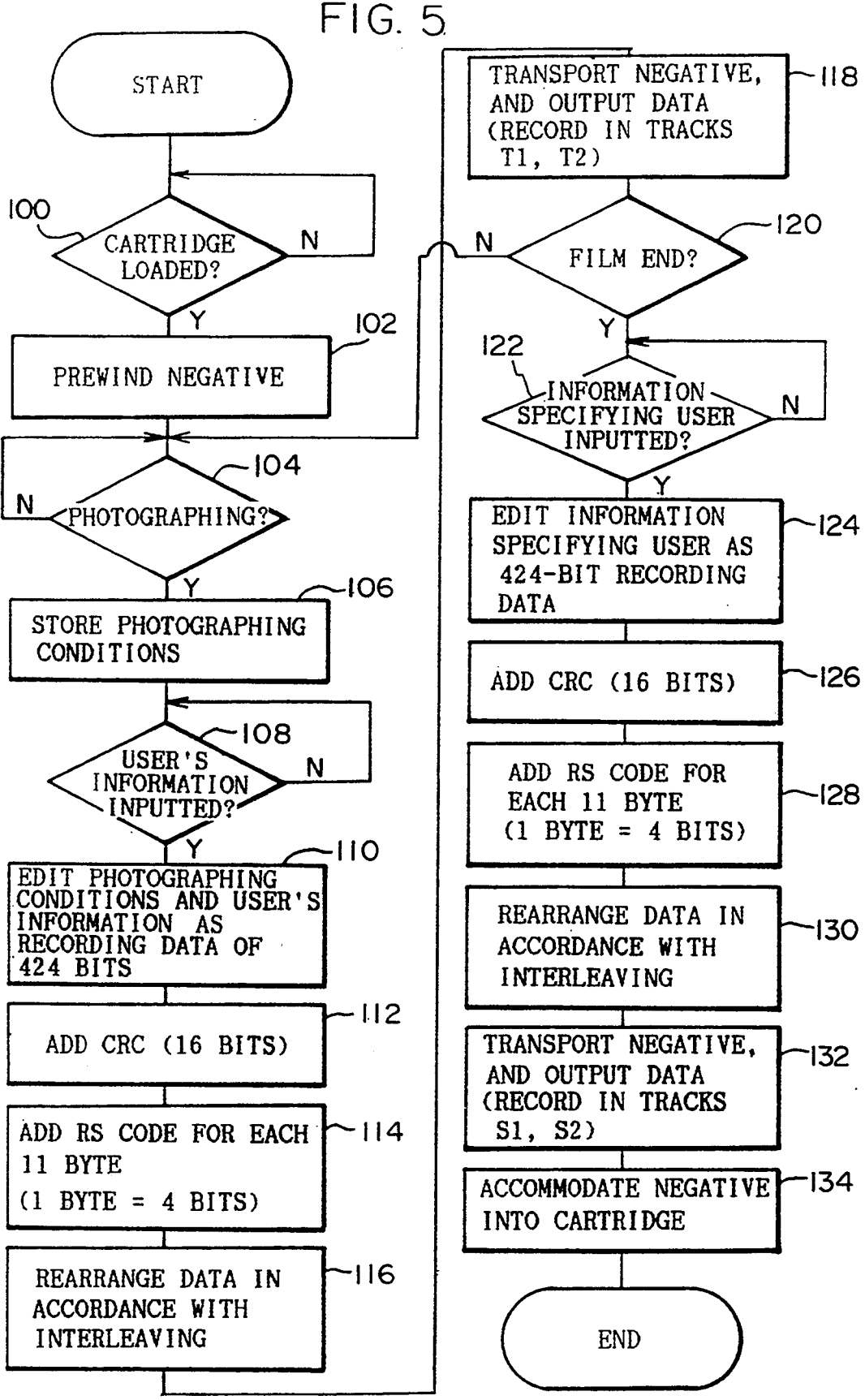
FIG. 5 is a flowchart illustrating processing for photographing and information recording in the camera.
Figure 6A:
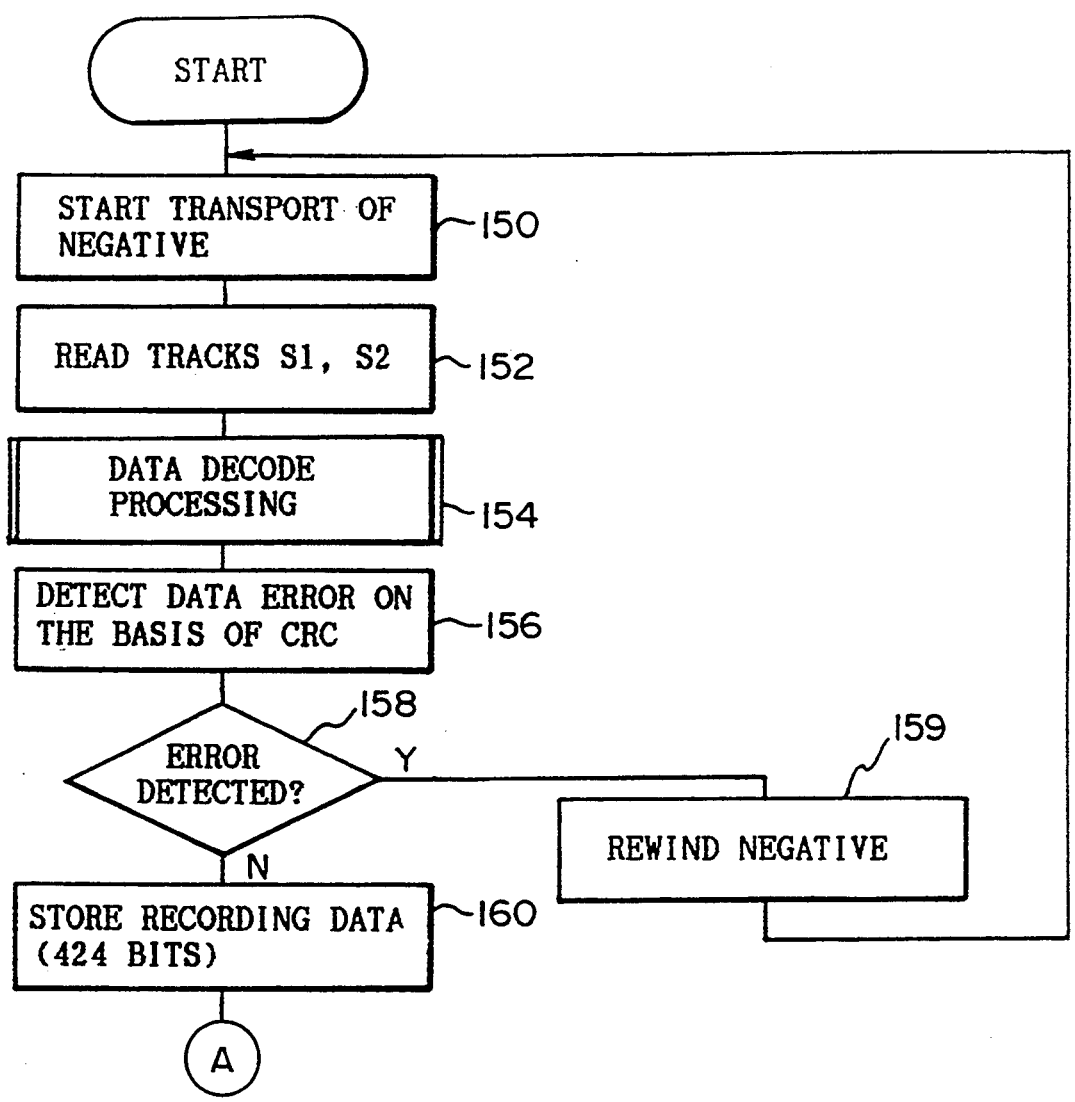
FIGS. 6A and 6B are flowcharts illustrating processing for information reading and printing in a photographic printer in accordance with the first embodiment.
Figure 6B:
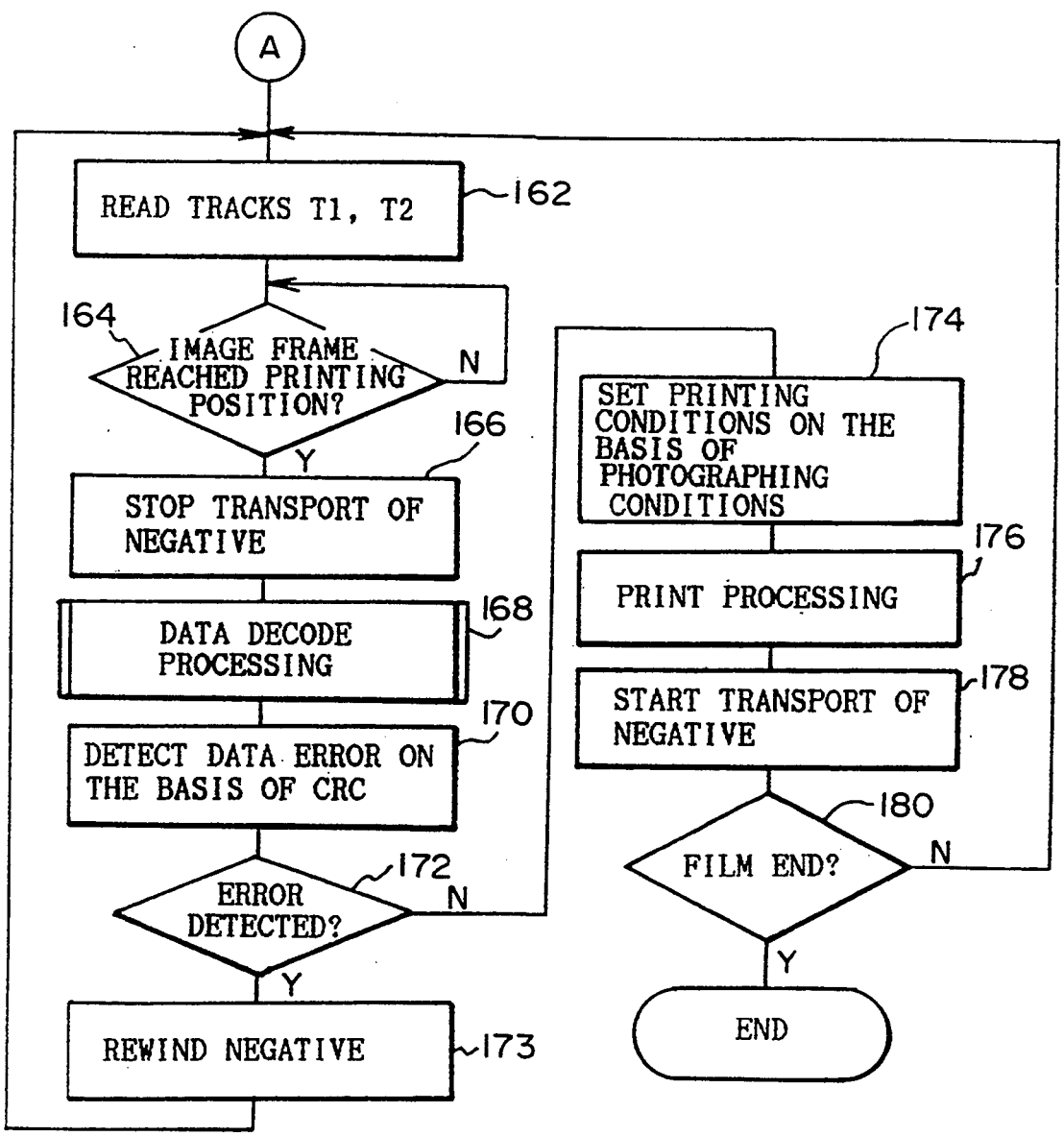
Figure 7:
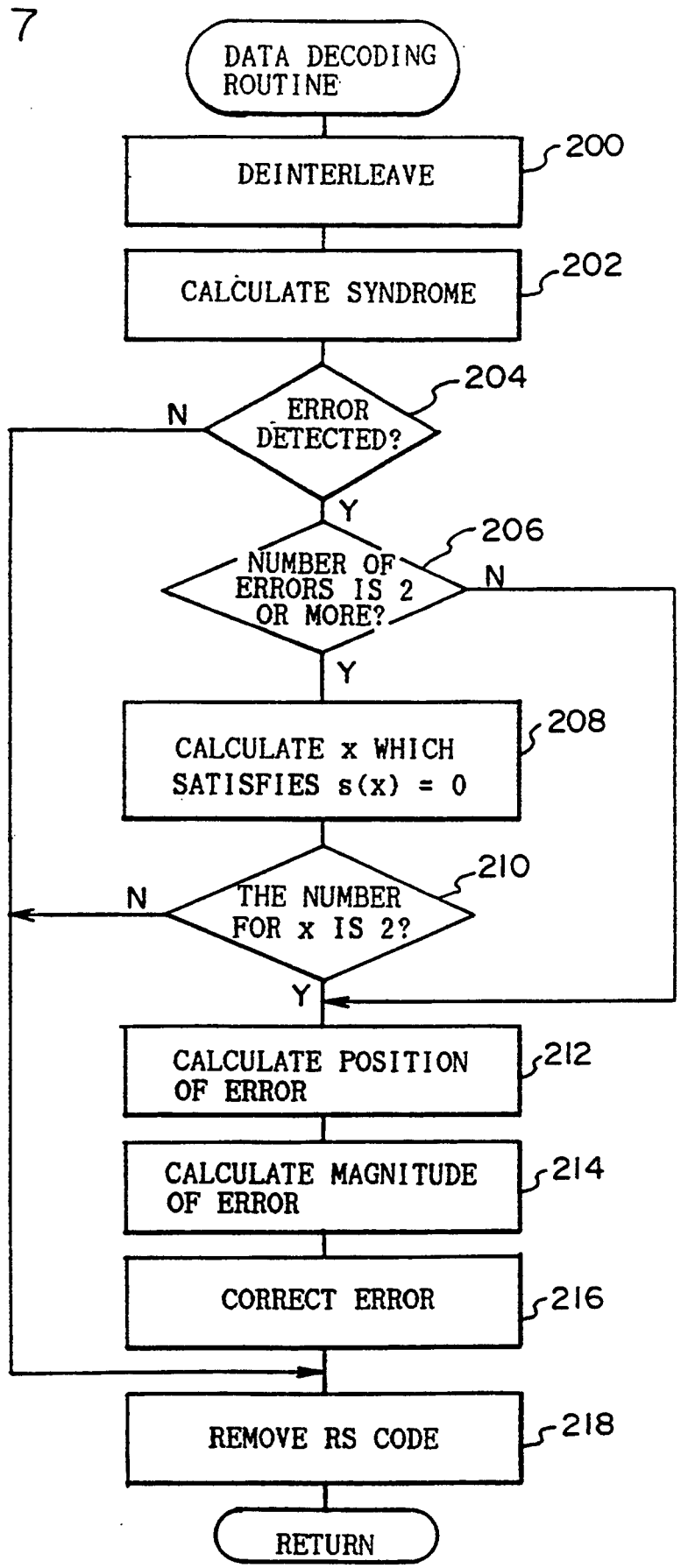
FIG. 7 is a flowchart illustrating data decode processing in the photographic printer.

Referring now to FIGS. 5 to 7, a description will be given of the operation of this first embodiment. First, a description will be given of processing for photographing and information recording in the camera 50 with reference to the flowchart of FIG. 5.

In Step 100, a determination is made as to whether or not the cartridge 28 is loaded. If the cartridge 28 is loaded in the camera 50, YES is given as the answer in the determination in Step 100, and the operation proceeds to Step 102. In Step 102, the negative film 10 is drawn out from the cartridge 28 and all of the film 10 is temporarily taken up onto the drive reel 54. In an ensuing Step 104, a determination is made as to whether or not an image has been photographed. When an unillustrated shutter switch of the camera 50 is turned on, the control circuit 32 controls the optical system 36 to imagewise expose the negative film 10. As a result, YES is given as the answer in the determination in Step 104. At the same time, information indicating the photographing conditions of the photographed image frame 10A is inputted from the optical system 36 to the control circuit 32.

In Step 106, the information indicating the photographing conditions inputted from the optical system is stored in an unillustrated memory. In Step 108, a determination is made as to whether or not the user's information has been inputted. After photographing an image by turning on the shutter switch, the photographer operates the operation section 38 to input the user's information such as a title of the image, keyword, place of photographing and the like. When this is done, YES is given as the answer in the determination in Step 108.

Figure 8A:
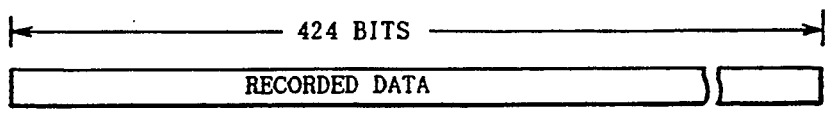
FIGS. 8A to 8E are conceptual diagrams illustrating a rearrangement of data in accordance with a method of adding codes and an interleaving method.

In an ensuing Step 110, the information indicating the photographing conditions inputted from the optical system 36 and the user's information inputted through the operation section 38 are respectively edited into data of 424 bits (see FIG. 8A) in accordance with a predetermined format.

In Step 112, the respective data of 424 bits is divided by a polynomial, and the remainder is added to the aforementioned data as CRC. As the polynomial, the following formula is used in this embodiment:

$$G(X) = X^{16} + X^{12} + X^5 + 1 = (10001000000100001)_2 \quad (1)$$

(where ( )$_2$ denotes a binary number)

Figure 8B:
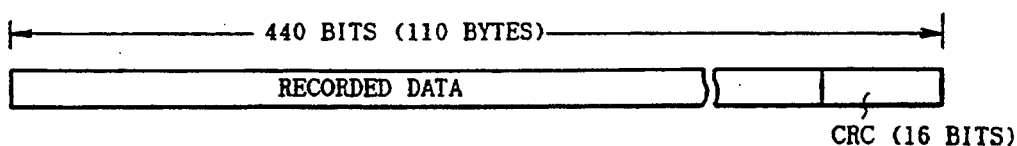

Since the binary data expressed by Formula (1) above is 17 bits, a remainder of 16 bits is produced as a result of the aforementioned division, and is added to an end of the data (see FIG. 8B). As a result, the size of the data including CRC is 440 bits, and becomes 110 bytes if 4 bits are assumed to be 1 byte.

Figure 8C:
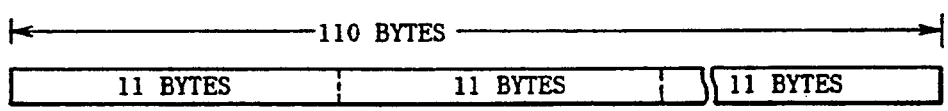

In Step 114, the data of 110 bytes including CRC is divided into 10 data groups of 11 bytes each (see FIG. 8C), and an RS code is added to the end of each data group. The addition of this RS code is effected as follows: First, the binary data of 11 bytes is converted to Galois group data in accordance with the conversion table shown in Table 1 below by setting 1 byte (4 bits) as one unit.

TABLE 1

| Binary Data | Galois Group Data |
|---|---|
| 0 = (0000)$_2$ | 0 |
| 1 = (0001)$_2$ | $1 = \alpha^0 = \alpha^{15}$ |
| 2 = (0010)$_2$ | $\alpha$ |
| 4 = (0100)$_2$ | $\alpha^2$ |
| 8 = (1000)$_2$ | $\alpha^3$ |
| 3 = (0011)$_2$ | $\alpha^4$ |
| 6 = (0110)$_2$ | $\alpha^5$ |
| 12 = (1100)$_2$ | $\alpha^6$ |
| 11 = (1011)$_2$ | $\alpha^7$ |
| 5 = (0101)$_2$ | $\alpha^8$ |
| 10 = (1010)$_2$ | $\alpha^9$ |
| 7 = (0111)$_2$ | $\alpha^{10}$ |
| 14 = (1110)$_2$ | $\alpha^{11}$ |
| 15 = (1111)$_2$ | $\alpha^{12}$ |
| 13 = (1101)$_2$ | $\alpha^{13}$ |
| 9 = (1001)$_2$ | $\alpha^{14}$ |

For instance, data of 11 bytes (1, 2, 3, 4, 5, 6, 7, 8, 9, 10, 11) is converted to (1, $\alpha$, $\alpha^4$, $\alpha^2$, $\alpha^8$, $\alpha^5$, $\alpha^{10}$, $\alpha^3$, $\alpha^{14}$, $\alpha^9$, $\alpha^7$) in accordance with Table 1.

It should be noted that the conversion into the Galois group data is generally effected by setting 8-bit data as one unit. However, as for bit patterns of 8-bit binary data, there are $2^8$ (=256) combinations. Hence, in order to effect the conversion into the Galois group data by using 8 bits as one unit, a conversion table having both 256 bit patterns and Galois group data corresponding to those patterns becomes necessary. To store this conversion table, a large-capacity memory needs to be mounted in the camera 50. In contrast, the conversion into the Galois group data using 4-bit data as one unit as in this embodiment can be effected by the conversion table (Table 1 above) having both $2^4 = 16$ bit patterns and the Galois group data corresponding to those patterns. Hence, it is possible to reduce the capacity of the memory mounted in the camera 50.

Next, the Galois group data thus converted is multiplied by a generator matrix G shown below so as to calculate the Galois group encoded data.

$$G = \begin{pmatrix} 10000000000\alpha^9 & \alpha^6 & \alpha^{13} & \alpha^9 \\ 01000000000\alpha^3 & \alpha^7 & \alpha^{10} & \alpha^8 \\ 00100000000\alpha^2 & 1 & \alpha^{10} & \alpha^4 \\ 00010000000\alpha^{13} & \alpha^4 & \alpha^8 & \alpha^9 \\ 00001000000\alpha^3 & \alpha^6 & \alpha^3 & \alpha^{13} \\ 00000100000\alpha^7 & \alpha^7 & \alpha & \alpha^4 \\ 00000010000\alpha^{13} & \alpha^6 & \alpha^{12} & \alpha^{12} \\ 00000001000\alpha^6 & \alpha^8 & \alpha^7 & \alpha^4 \\ 00000000100\alpha^{13} & \alpha^7 & 1 & \alpha^5 \\ 00000000010\alpha^{14} & \alpha^4 & \alpha^4 & \alpha^3 \\ 00000000001\alpha^{12} & \alpha^4 & 1 & \alpha^6 \end{pmatrix} \quad (2)$$

For instance, if the aforementioned Galois Group data is multiplied by the Generator matrix G of Formula (2), the Galois Group encoded data of (1, $\alpha$, $\alpha^4$, $\alpha^2$, $\alpha^8$, $\alpha^5$, $\alpha^{10}$, $\alpha^3$, $\alpha^{14}$, $\alpha^9$, $\alpha^7$, $\alpha^4$, $\alpha^4$, $\alpha^6$, $\alpha^6$) is obtained. Furthermore, the Galois group encoded data is converted to binary encoded data in accordance with Table 1. For instance, the Galois group encoded data is converted to binary encoded data which is 15 bytes and in which the values of the respective bytes are (1, 2, 3, 4, 5, 6, 7, 8, 9, 10, 11, 3, 3, 12, 12). In this binary encoded data of 15 bytes, the last 4 bytes (3, 3, 12, 12) correspond to the RS code, and it therefore follows that the 4-byte RS code is added to the end of each 11-byte data (see FIG. 8D). As a result, the size of the data including the RS code becomes 150 bytes.

Figure 8D:
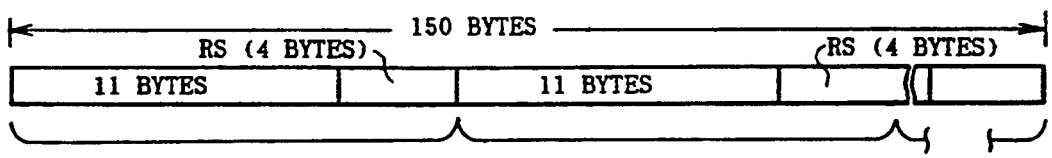
Figure 8E:
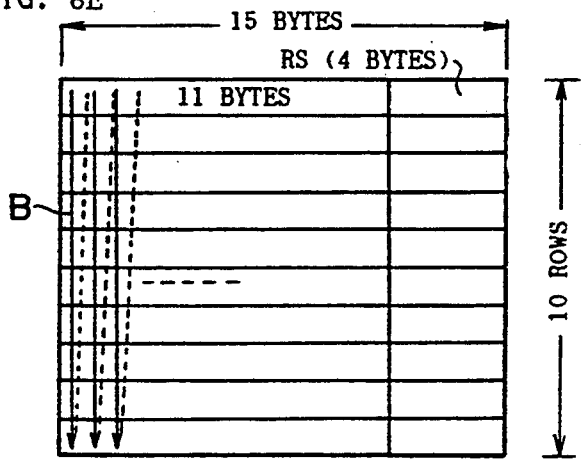

In an ensuing Step 116, the data with the RS code added thereto is rearranged in accordance with the interleaving method. This rearrangement is effected by superposing the 10 data groups in each of which the 15-byte data including the RS code is set as one unit, as shown in FIG. 8E. It should be noted that the direction of arrow B in FIG. 8E is the direction of data reading in an unillustrated memory for storing the data, and the rearranged data is read in the direction of arrow B. It should be noted that the processing of the aforementioned Steps 112 and 116 is effected with respect to the information indicating the photographing conditions and the user's information.

In Step 118, the motor 30 is driven to start advancing the negative film 10, and the data stored in the memory is read in the direction of arrow B and is outputted consecutively from the control circuit 32 to the modulator 42. The modulator 42 converts the inputted data into a write signal and supplies the same to the magnetic head 56. As a result, the information indicating the photographing conditions is magnetically recorded in the track T1, and the user's information is magnetically recorded in the track T2. At this time, since the film advancement by the motor 30 is carried out in an unstable manner, the information is recorded in a state in which the advancing speed varies.

In Step 120, a determination is made as to whether or not the total number of frames of the negative film 10 has been photographed, i.e., whether or not 36 photographings have been effected with a 36-frame negative film, for instance. If NO is the answer in the determination in Step 120, the operation returns to Step 104 to repeat Steps 104 to 120 until YES is given as the answer in the determination in Step 120, thereby photographing the total number of frames of the negative film 10 and recording the information on the photographed images in the tracks T1 and T2.

If YES is the answer in the determination in Step 120, the operation proceeds to Step 122 to determine whether or not the information specifying the user has been inputted. If the total number of frames of the negative film 10 has been photographed, the photographer operates the operation section 38 to input the information specifying the user such as the user ID, name, and address. As a result, YES is given as the answer in the determination in Step 122, and then in Steps 124 to 132 information is recorded in the tracks S1 and S2 in the same way as described above.

That is, in Step 124, the inputted information specifying the user is edited into 424-bit data in accordance with the predetermined format. In Step 126, the data is divided by the polynomial shown in Formula (1), and the remainder is set as CRC and is added to the end of the data. In Step 128, the data with CRC added thereto is divided into 11 bytes each, and after the divided data is converted to the Galois group data and is multiplied by the generator matrix G, the data is converted to binary encoded data, and the 4-byte RS code is added thereto. In Step 132, the data with the RS code added thereto is rearranged in accordance with the interleaving method and, in Step 134, the motor 30 is driven to start advancing the negative film 10, and the data stored in the memory is consecutively outputted to the modulator 42. As a result, the data converted to the write signal by the modulator 42 is supplied to the magnetic head 56, and the information specifying the user is magnetically recorded in the tracks S1 and S2. In an ensuing Step 134, all of the negative film 10 is rewound back into the cartridge 28 and the advancing is stopped, thereby completing the processing.

Referring now to the flowcharts shown in FIGS. 6 and 7, a description will be given of the processing for information reading and printing by the photographic printer 60. The negative film 10 in which images have been photographed by the camera 50 is accepted by a DEP shop, is subjected to various processing including development, fixing, washing, and drying at the lab. In the case of simultaneous printing, the negative film 10 is set in the photographic printer 60. This starts the flowchart shown in FIG. 6.

In Step 150, the transporting of the negative film 10 is started by the drive unit 66 of the negative carrier 64. When the tracks S1 and S2 of the negative film 10 reach the position where the read head 80 is located, the data recorded in the tracks S1 and S2 is read by the read head 80 in an ensuing Step 152. At the time of this reading, the film is transported at a substantially fixed transport speed.

Figure 9:
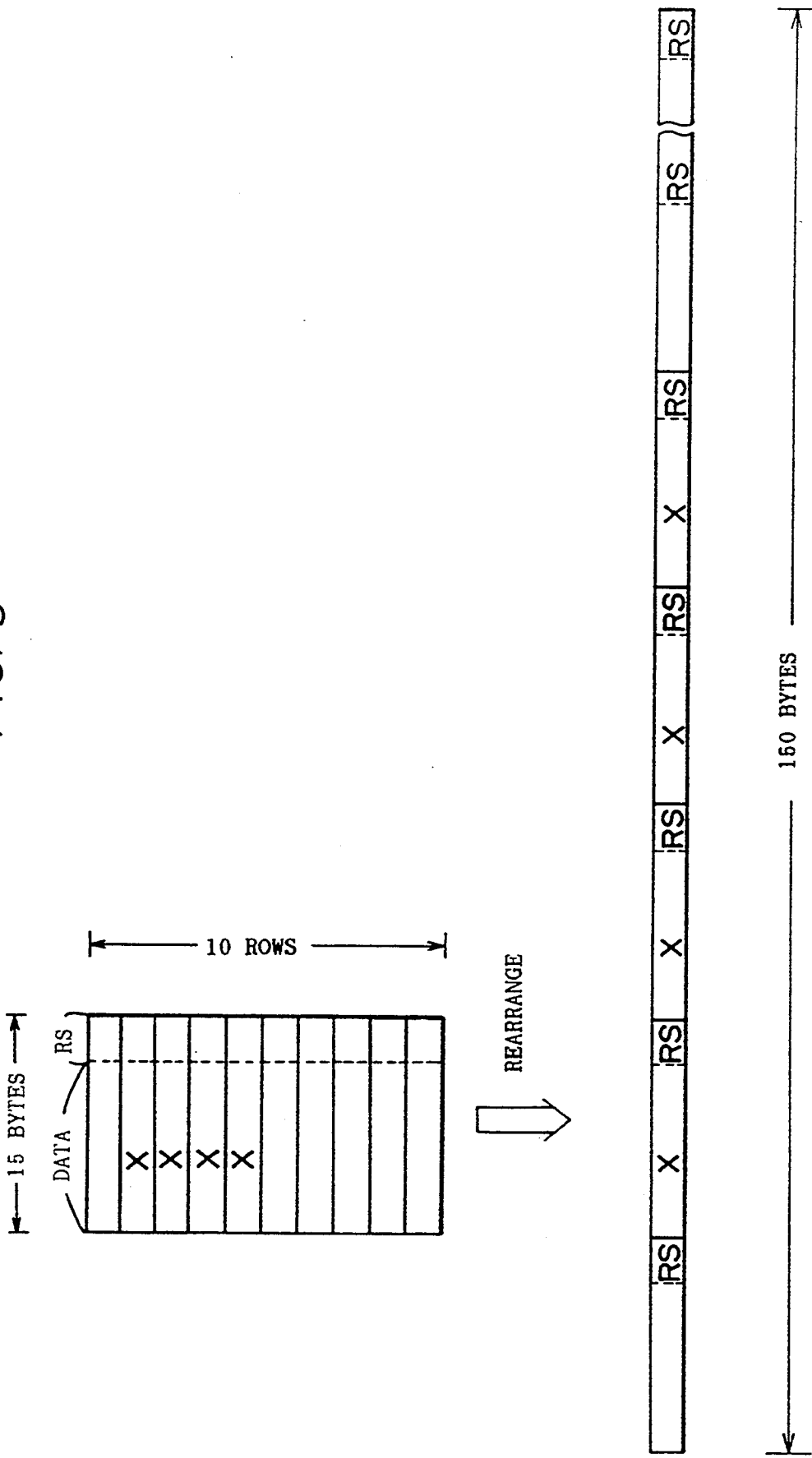
FIG. 9 is a conceptual diagram illustrating the operation of interleaving.

In an ensuing Step 154, the data thus read is subjected to decode processing. A description will be given of this data decode processing with reference to the flowchart shown in FIG. 7. In Step 200, so-called deinterleaving is effected in which the data rearranged in accordance with the aforementioned interleaving method is rearranged so as to be restored to its original state. The data which has been read is rearranged in the memory consecutively, starting with the leading bit, as indicated by arrow B in FIG. 8E. Furthermore, the 10 data groups each having 15 bytes as a unit are consecutively arranged in the same way as shown in FIG. 8D, so as to form a data train of 150 bytes. As a result, when the data recorded in the track S1 or S2 is read, even in the event that a burst error has occurred due to a tracking error or the like of the reading apparatus, and bits whose values are misread occur consecutively, as shown in FIG. 9 (in FIG. 9, the 4 bits indicated by "x" are consecutively in error), the bits whose values have been misread are distributed to data groups as they are rearranged.

In an ensuing Step 202 and thereafter, the error correction of data of the upper 11 bytes is effected on the basis of the RS code of the lower 4 bytes in each data group arranged as described above. In this data error correction using the RS code, the error of 2 bytes in the data of the upper 11 bytes can be corrected. Namely, in Step 202, the calculation of a syndrome is effected with respect to each of the 10 data groups each having 15 bytes as a unit. This calculation of the syndrome is effected such that after the data rearranged by deinterleaving is converted to the Galois group data, the data is multiplied by a transposed matrix $H^T$ of a check matrix H shown below.

$$H = \begin{pmatrix} 1 & 1 & 1 & 1 & 1 & 1 & 1 & 1 & 1 & 1 & 1 & 1 & 1 & 1 & 1 \\ \alpha^{14} & \alpha^{13} & \alpha^{12} & \alpha^{11} & \alpha^{10} & \alpha^9 & \alpha^8 & \alpha^7 & \alpha^6 & \alpha^5 & \alpha^4 & \alpha^3 & \alpha^2 & \alpha & 1 \\ \alpha^{13} & \alpha^{11} & \alpha^9 & \alpha^7 & \alpha^5 & \alpha^3 & \alpha & \alpha^{14} & \alpha^{12} & \alpha^{10} & \alpha^8 & \alpha^6 & \alpha^4 & \alpha^2 & 1 \\ \alpha^{12} & \alpha^9 & \alpha^6 & \alpha^3 & 1 & \alpha^{12} & \alpha^9 & \alpha^6 & \alpha^3 & 1 & \alpha^{12} & \alpha^9 & \alpha^6 & \alpha^3 & 1 \end{pmatrix}$$

For instance, in a case where a specific data group (1, 2, 3, 4, 5, 6, 7, 8, 9, 10, 11, 3, 3, 12, 12) is read without any occurrence of data error, the syndrome is calculated as follows:

Syndrome
$(S_0, S_1, S_2, S_3) = (1\ \alpha\alpha^4\ \alpha^2\ \alpha^8\ \alpha^5\ \alpha^{10}\ \alpha^3\ \alpha^{14}\ \alpha^9\ \alpha^7\ \alpha^4\ \alpha^4\ \alpha^6\ \alpha^6)$.

$$\begin{pmatrix} 1 & \alpha^{14} & \alpha^{13} & \alpha^{12} \\ 1 & \alpha^{13} & \alpha^{11} & \alpha^9 \\ 1 & \alpha^{12} & \alpha^9 & \alpha^6 \\ 1 & \alpha^{11} & \alpha^7 & \alpha^3 \\ 1 & \alpha^{10} & \alpha^5 & 1 \\ 1 & \alpha^9 & \alpha^3 & \alpha^{12} \\ 1 & \alpha^8 & \alpha & \alpha^9 \\ 1 & \alpha^7 & \alpha^{14} & \alpha^6 \\ 1 & \alpha^6 & \alpha^{12} & \alpha^3 \\ 1 & \alpha^5 & \alpha^{10} & 1 \\ 1 & \alpha^4 & \alpha^8 & \alpha^{12} \\ 1 & \alpha^3 & \alpha^6 & \alpha^9 \\ 1 & \alpha^2 & \alpha^4 & \alpha^6 \\ 1 & \alpha & \alpha^2 & \alpha^3 \\ 1 & 1 & 1 & 1 \end{pmatrix} = (0, 0, 0, 0)$$

In an ensuing Step 204, a determination is made as to whether or not there is any error in the data. In a case where all the values of the syndrome ($S_0\ S_1\ S_2\ S_3$) are zeros, NO is given as the answer in the determination in Step 204. Then, in Step 218, the 4-byte RS codes respectively added to the ends of the data groups are removed, thereby completing this data decode processing. In addition, in a case where, for instance, a data error has occurred at the time of reading a specific data group, and the data which has been read is (1, 2, 2, 4, 5, 6, 7, 8, 9, 10, 11, 3, 3, 12, 12) (the third data has shifted from "3" to "2"), the syndrome becomes ($S_0\ S_1\ S_2\ S_3$)=(1 $\alpha^{12}\alpha^9$ $\alpha^6$), so that YES is given as the answer in the determination in Step 204. When YES is given as the answer in the determination in Step 204, the operation proceeds to Step 206 in which a determination is made on the basis of M obtained in accordance with a determination formula shown in Formula (3) below as to whether or not the number of 1-byte data concerning which a data error has occurred is 2 or more.

$$M = \begin{vmatrix} S_1 & S_0 \\ S_2 & S_1 \end{vmatrix} \quad (3)$$

For instance, in the aforementioned case of $(S_0\ S_1\ S_2\ S_3) = (1\ \alpha^{12} \alpha^9\ \alpha^6)$, if each value is substituted for the above determination formula, we have $M=0$. In this case, it is determined that the number of data concerning which the data error has occurred is 1, so that NO is given as the answer in the determination in Step 206, and the operation proceeds to Step 212. Meanwhile, in a case where the data which has been read is, for instance, (1, 2, 3, 6, 5, 6, 7, 8, 2, 10, 11, 3, 3, 12, 12) (the fourth data has shifted from "4" to "6" and the ninth data from "9" to "2"), the syndrome becomes $(S_0\ S_1\ S_2\ S_3) = (\alpha^{14}\ \alpha\ \alpha^5\ \alpha^2)$, so that if each value is substituted for the above determination formula, we have $M = \alpha^{10}$. Thus, in a case where $M \neq 0$, it is determined that the number of data concerning which the data error has occurred is 2 or more, so that YES is given as the answer in the determination in Step 206.

If YES is the answer in the determination in Step 206, the operation proceeds to Step 208, and coefficients $\sigma_1$ and $\sigma_2$ are first determined in accordance with Formula (4) below.

$$\sigma_1 = \frac{1}{M} \begin{vmatrix} -S_2 & S_0 \\ -S_3 & S_1 \end{vmatrix} \quad (4)$$

$$\sigma_2 = \frac{1}{M} \begin{vmatrix} S_1 & -S_2 \\ S_2 & -S_3 \end{vmatrix}$$

If the coefficients $\sigma_1$ and $\sigma_2$ of the syndrome $(S_0\ S_1\ S_2\ S_3) = (\alpha^{14}\ \alpha\alpha^5\ \alpha^2)$ are determined on the basis of Formula (3) above, we have $$\sigma_1 = \frac{1}{\alpha^{10}} \begin{vmatrix} -\alpha^5 & \alpha^{14} \\ -\alpha^2 & \alpha \end{vmatrix} = \frac{\alpha^{11}}{\alpha^{10}} = \alpha$$

$$\sigma_2 = \frac{1}{\alpha^{10}} \begin{vmatrix} \alpha & -\alpha^5 \\ \alpha^5 & -\alpha^2 \end{vmatrix} = \frac{\alpha^{12}}{\alpha^{10}} = \alpha^2$$

It should be noted that the addition of the Galois group data is effected by means of an exclusive OR. The variable x which satisfies an equation shown in the following Formula (5)

$$\sigma(x) = x^2 + \sigma_1 x + \sigma_2 = x^2 + \alpha x + \alpha^2 = 0 \quad (5)$$

which is determined by the coefficients $\sigma_1$ and $\sigma_2$ is $\alpha^6$ and $\alpha^{11}$. In an ensuing Step 210, a determination is made as to whether or not the number of x is 2. If YES is the answer in the determination in Step 210, the positions of data where the data error has occurred are determined in Step 212. In the aforementioned case, the positions are determined to be as follows:

$\sigma(\alpha^6) = 0 \quad 15 - 6 = $ 9th digit $\sigma(\alpha^{11}) = 0 \quad 15 - 11 = $ 4th digit In an ensuing Step 214, the magnitudes of the values of the respective data errors are determined. In the aforementioned case, The magnitude of the error at the 9th digit $$= \frac{1}{\alpha^6 + \alpha^{11}} \begin{vmatrix} S_0 & 1 \\ S_1 & \alpha^{11} \end{vmatrix} = \frac{1}{\alpha} \begin{vmatrix} \alpha^{14} & 1 \\ \alpha & \alpha^{11} \end{vmatrix} = \alpha^7$$

The magnitude of the error at the 4th digit $$= \frac{1}{\alpha^6 + \alpha^{11}} \begin{vmatrix} 1 & S_0 \\ \alpha^6 & S_1 \end{vmatrix} = \frac{1}{\alpha} \begin{vmatrix} 1 & \alpha^{14} \\ \alpha^6 & \alpha \end{vmatrix} = \alpha$$

In an ensuing Step 216, error correction is effected by adding values of the magnitudes of the data errors obtained above to the 4th- and 9th-digit data in the data which has been read. Hence, the 9th- and 4th-digit data are respectively corrected as follows:

9th digit = $\alpha + \alpha^7 = \alpha^{14}$

4th digit = $\alpha^5 + \alpha = \alpha^2$

Thus, in the data error correction using the RS code in Steps 202 to 216, the data errors of 2 bytes in the 15 bytes in each data group can be corrected. Accordingly, even if a burst error occurs in which the consecutive bits in the data which has been read become a data error, the bits causing the data error are distributed to the data groups through the combined use of deinterleaving in Step 200. Hence, it is possible to correct a burst error in which 80 bits at a maximum continue.

After the execution of Step 216, the 4-byte RS code added to the end of each data group is removed in Step 218, and the operation proceeds to Step 156 in the main routine shown in FIG. 6. Meanwhile, in a case where NO is the answer in the determination in Step 210, it means that a data error has positively occurred in the data of 3 bytes or more, and there is the possibility of making an erroneous correction. For this reason, this processing of the data decoding routine is ended without effecting data error correction processing in Steps 212 to 216.

In Step 156 in the flowchart shown in FIG. 6, in the 110-byte (440-bit) data with the RS code removed, a data error is detected by referring to the lower 16 bits corresponding to CRC, and a determination is made in Step 158 as to whether or not there is any data error. This error detection is effected by examining whether the 440-bit data is divisible by the polynomial shown in Formula (1) above. If it is not divisible, it is determined that there is a data error, and YES is given as the answer in Step 158, and the operation proceeds to Step 159. In Step 159, the negative film 10 is rewound, and the operation returns to Step 150 so as to repeat the reading and decode processing of data recorded in the tracks S1 and S2. On the other hand, if the 440-bit data is divisible, it is determined that there is no data error, and the operation proceeds to Step 160.

In Step 160, the data of the lower 16 bits is removed to extract the 424-bit data (see FIG. 8A), and this 424-bit data is stored in the memory. The data recorded in the tracks S1 and S2 is data specifying the user, and the stored data is supplied to later processes so as to be utilized in such as a collation process for collation between the negative film and the print. In the aforementioned processing, an error in the data which has been read from the tracks S1 and S2 is corrected by both deinterleaving and the RS code, and the error which could not be corrected is detected by CRC. Hence, it is possible to obviate an undesirable situation in which inaccurate information is supplied to later processes.

When the tracks T1 and T2 of the negative film 10 reach the position where the read head 80 is located, the data recorded in the tracks T1 and T2 is read by the read head 80 in an ensuing Step 162. In an ensuing Step 164, a determination is made as to whether or not the image frame 10A recorded in the negative film 10 has reached the printing position. If YES is the answer in the determination in Step 164, the transport of the negative film 10 is stopped in Step 166.

In an ensuing Step 168, the flowchart of FIG. 7 is executed in the same way as described above, and the decode processing of the data which has been read is effected to extract 424-bit data. Namely, deinterleaving is effected with respect to the data which has been read in the memory, and a 150-byte data train is formed. Then, a syndrome is determined for each data group, and after the number of errors, positions, and magnitudes thereof are calculated and the error correction is effected, the RS code of each data group is removed.

In an ensuing Step 170, the data error detection is effected by referring to the data of the lower 16 bits corresponding to the CRC of the 110-byte (440-bit) data with the RS code removed. In Step 172, a determination is made as to whether or not there is any data error. If YES is the answer in the determination in Step 172, the negative film is rewound in Step 173, and the operation returns to Step 162 to repeat the reading and decode processing of the data recorded in the tracks T1 and T2. If NO is the answer in the determination in Step 172, after the data of the lower 16 bits is removed and the 424-bit data is extracted, the operation proceeds to Step 174.

Information indicating the photographing conditions is recorded in the track T1. In Step 174, the image frame 10A positioned at the printing position is photometrically measured by an unillustrated densitometer, and the printing conditions of the image frame 10A are set on the basis of the photometric value obtained by this photometry and the information indicating the photographing conditions included in the data. In an ensuing Step 176, the operation of the light source 62, the filter 70, the shutter 76 and the like is controlled in correspondence with the printing conditions to print the image on the image frame 10A onto the printing paper 74.

It should be noted that an error in the data which has been read from the tracks T1 and T2 as described above is corrected by both deinterleaving and the RS code, and the error which could not be corrected is detected by CRC. Hence, it is possible to obviate an undesirable situation in which inappropriate printing conditions are set on the basis of the misread data.

In Step 178, the transport of the negative film 10 is started. In addition, at this time, the information on the exposure conditions and the like is processed in the same way as in Steps 110 to 116 in the flowchart of FIG. 5, and is recorded in each track via the modulator 88, the recording current amplifier 92, and the recording head 92. The information recorded by the photographic printer 60 is read in later processes in the same manner as described above and is used for various processing. In an ensuing Step 180, a determination is made as to whether or not the print processing of all the image frames 10A recorded on the negative film 10 has been completed. If NO is the answer in the determination in Step 180, the operation returns to Step 162, and Steps 162 to 178 are repeated until YES is given as the answer in the determination in Step 180, thereby setting the printing conditions on the basis of the information indicating the photographing conditions and effecting the print processing under the set printing conditions. If YES is given as the answer in Step 180, processing ends.

[Second Embodiment]

Figure 10A:
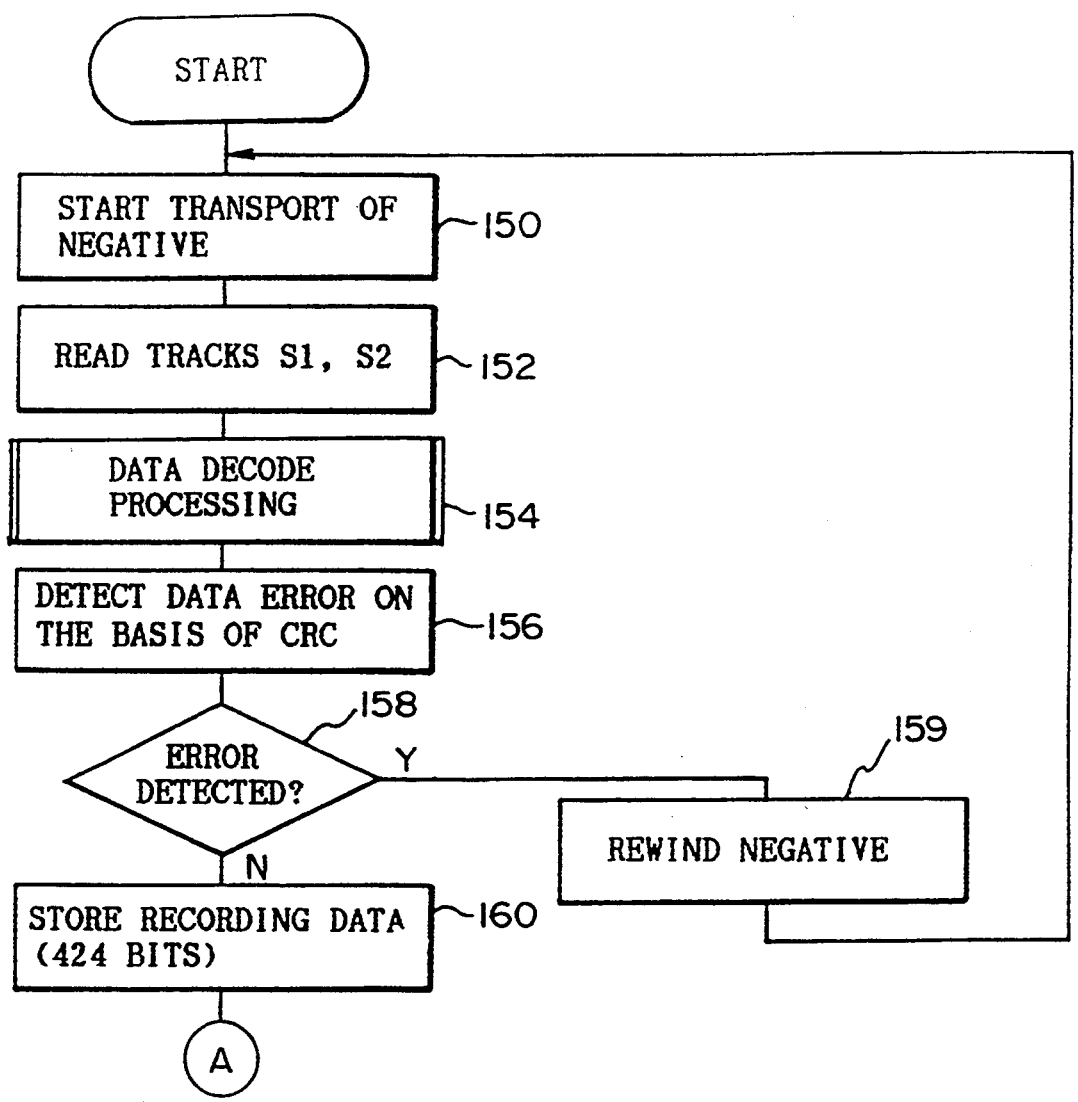
FIGS. 10A and 10B are flowcharts illustrating processing for information reading and printing in the photographic printer in accordance with a second embodiment.
Figure 10B:
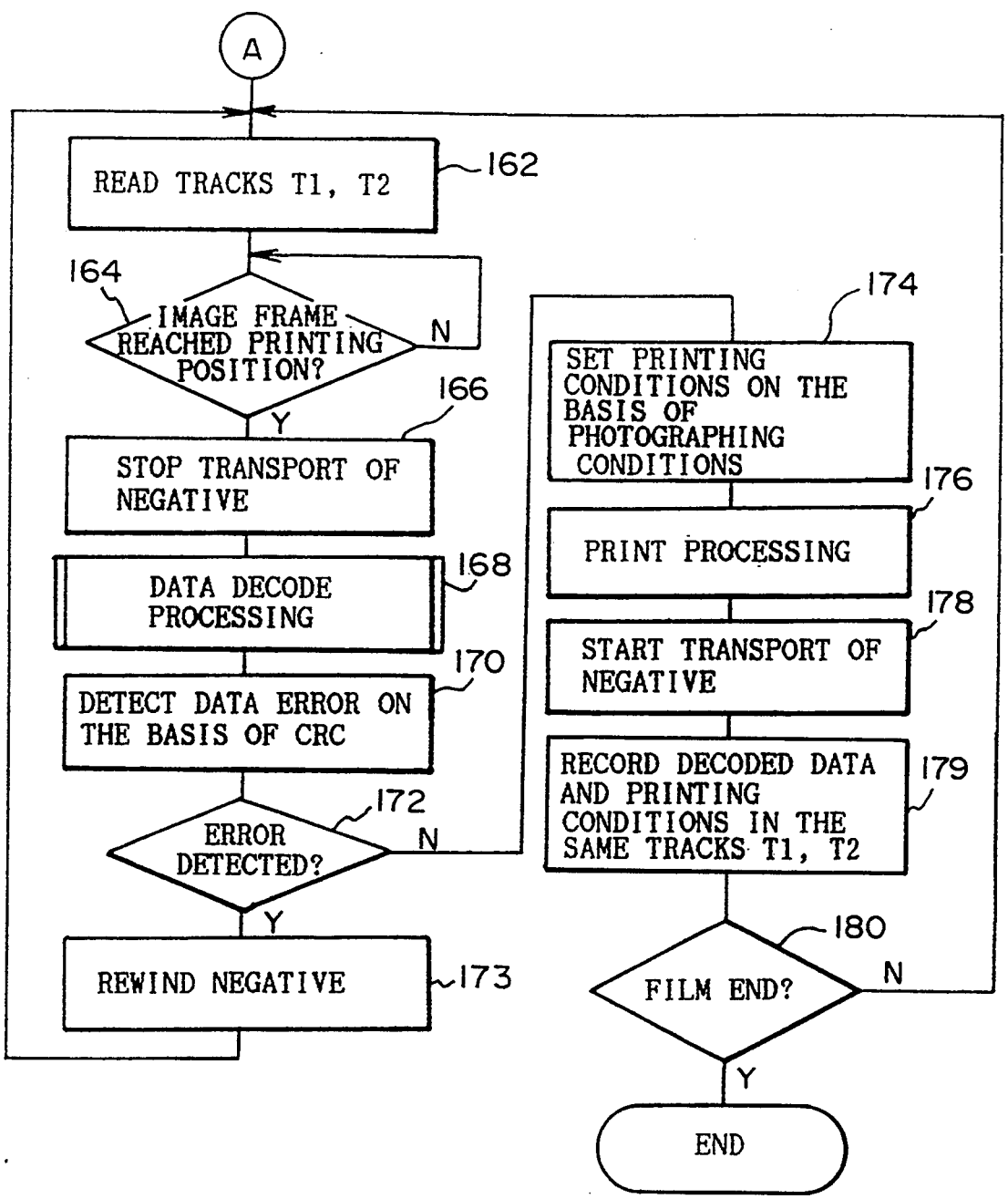

Referring now to FIGS. 10 to 14, a description will be given of a second embodiment of the present invention. It should be noted that those component parts or portions that are identical to those of the first embodiment will be denoted by the same reference numerals, and a description thereof will be omitted. In this second embodiment, as shown in the flowchart of FIG. 10, in Step 179, the information which has been read and subjected to error correction and error detection is recorded again in the same tracks T1 and T2 of the negative film 10. As a result, when the data recorded in the tracks T1 and T2 is read again in processes downstream of the photographic printing process, the possibility of trouble being caused by a reading failure or the like can be further reduced.

A description will be given hereafter with reference to FIGS. 11A to 11H. It is assumed that, at the time of recording information in the camera 50, when the advancing speed has reached a predetermined value or more after the starting of the advancement of the negative film 10, as shown in FIG. 11B, a signal representing consecutive binary data (2, 1, 2, 1, 1, 2 . . . ), as shown in FIG. 11A, is started to be recorded in the tracks T1 and T2. Since the advancing speed of the negative film 10 in the camera 50 changes even after reaching the predetermined value or more (FIG. 11B), the physical length (distance on the film) of a pulse interval corresponding to the data "1" and of a pulse interval corresponding to the data "2" in the signal recorded in the tracks T1 and T2 also changes as shown in FIG. 11C. It should be noted that $X1' \neq X1''$, $X2' \neq X2''$, and the data (2'', 1', 2'', 1', . . . ) shows that the pulse intervals have changed from those corresponding to the original values.

Meanwhile, the transport condition of the negative film 10 in the photographic printer 60 is stable as compared with that in the camera 50, and the negative film 10 can be transported at a substantially fixed speed, as shown in FIG. 11D. For this reason, the time length of a portion corresponding to each data in the signal reproduced by the read head 80 also changes in response to a change in the physical length of the pulse intervals of the signal recorded in the tracks T1 and T2.

Figure 12:
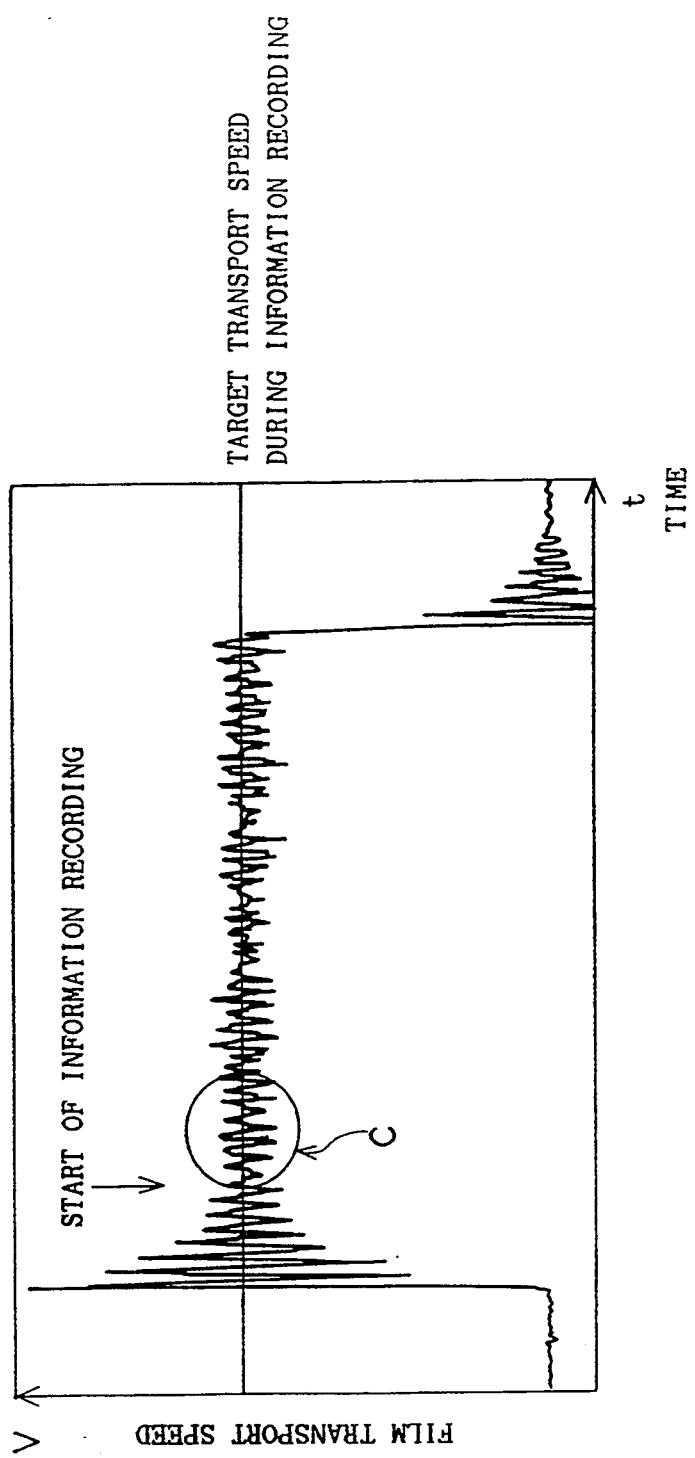
FIG. 12 is a diagram illustrating an example of the variation of the film transport speed when the film is transported by one frame.

Referring now to FIGS. 12 and FIGS. 13A to 13D, a more detailed description will be given of the trouble associated with the change in the transport speed. When the negative film 10 is transported by a one-frame portion and the transport is stopped, the transport speed of the negative film changes as shown in FIG. 12. That is, when the transport is started or stopped, the tension and the like applied to the negative film 10 are unstable, and the transport speed V changes substantially. The amplitude of the change becomes gradually smaller with the lapse of time, but the variation of the transport speed V continues while the negative film 10 is being transported, i.e., after the starting of information recording.

Meanwhile, in a signal such as the one shown in FIG. 13A, a rise and a fall are alternately repeated, and an interval between an adjacent pair of the rise and the fall is made short at a portion corresponding to the data "1" ($t_1$) and is made long at a portion corresponding to the data "2" ($t_2 = 2 \times t_1$). When this signal is inputted to the magnetic head 56, the magnetic head 56 records in the track a signal of a waveform in which the signal mentioned above is differentiated (a waveform in which pulses occur at the rise and the fall), as shown in FIG. 13B.

Here, it is assumed that the transport speed V of a portion indicated by an arrow C in FIG. 12 varies sinusoidally, as is also shown in the following Formula (6) (see FIG. 13C as well):

$$V = AS + SF \cdot \sin(2\pi ft + tp) \qquad (6)$$

(where, AS: average speed, SF: coefficient indicating the magnitude of the speed change)

Furthermore, if it is assumed that pulses 94, 96, and 98 of the aforementioned signal is recorded at timings shown in FIG. 13B, a distance L1 between recording positions of the pulses 94 and 96 on the track is proportional to a result obtained by integrating the transport speed V of the negative film 10 by a section corresponding to an interval between recording timings of the pulses 94 and 96, i.e., to an area L1 shown in FIG. 13C. Similarly, a distance L2 between recording positions of the pulses 96 and 98 on the track is proportional to a result obtained by integrating the transport speed V of the negative film 10 by a section corresponding to an interval between recording timings of the pulses 96 and 98, i.e., to an area L2 shown in FIG. 13C.

Moreover, if it is assumed that the negative film 10 is transported at a fixed speed at the time of information reading, an interval $t_1'$ between pulses 94A and 96A of a reproduced signal (see FIG. 13D) is proportional to the distance $L_1$, i.e., the area L1, while an interval $t_2'$ between the pulse 96A and a pulse 98A is proportional to the distance $L_2$, i.e., the area L2. If this is expressed in the form of formulae, we have $$\left. \begin{array}{l} t_1' = a \cdot L1 = a \cdot \int^{t_1} V(t)dt \\ \\ t_2' = a \cdot L2 = a \cdot \int^{t_2} V(t)dt \end{array} \right\} \qquad (7)$$

(where, a: proportional constant)

As can be seen from Formulae (7) above and FIGS. 13A to 13D, when the transport speed of the negative film 10 is high, the interval between the recorded pulses becomes long, whereas when the transport speed is low, the interval between the recorded pulses becomes short. As a result, a ratio between the pulse interval corresponding to the data "1" and the pulse interval corresponding to the data "2" also varies.

Accordingly, a change in the transport speed of the negative film 10 causes a change in the pulse interval, with the result that a reading error may possibly occur. Furthermore, if the magnitude of the speed change (the magnitude of the coefficient SF in Formula (6) above) is sufficiently large, there are cases where the pulse intervals of the reproduced signal become such that $t_1' \geq t_2'$, in which case a reading error occurs positively. If such a signal is converted to binary data, and processing such as the determination of printing conditions is conducted by using the converted data as it is, there occurs a drawback in that printing conditions cannot be set properly.

However, by virtue of the data decode processing in Step 168, most of the errors are corrected and the uncorrected errors are detected, as described in connection with the first embodiment. Hence, it is possible to obtain a signal in which the data before recording is accurately reproduced, as shown in FIG. 11F. If this signal is recorded in the tracks T1 and T2 in a state in which the negative film 10 is transported at a substantially fixed speed, as shown in FIG. 11G, the pulse interval corresponding to the data "1" recorded in the tracks T1 and T2 and the pulse interval corresponding to the data "2" become substantially fixed (see FIG. 11H). Accordingly, when the data recorded in the tracks T1 and T2 is read again in a process downstream of the photographic printing process, the occurrence of a reading error or the like is prevented.

It should be noted that, in the above-described embodiment, the processing consisting of information reading and printing is performed consecutively one frame at a time with respect to the recorded image frames of the negative film 10 in the photographic printer 60. However, the present invention is not limited to the same, and an arrangement may be alternatively provided such that, as shown in the flowchart of FIG. 14, the printing of the image frames may be effected after the information reading is effected with respect to all the image frames of the negative film 10.

Figure 14A:
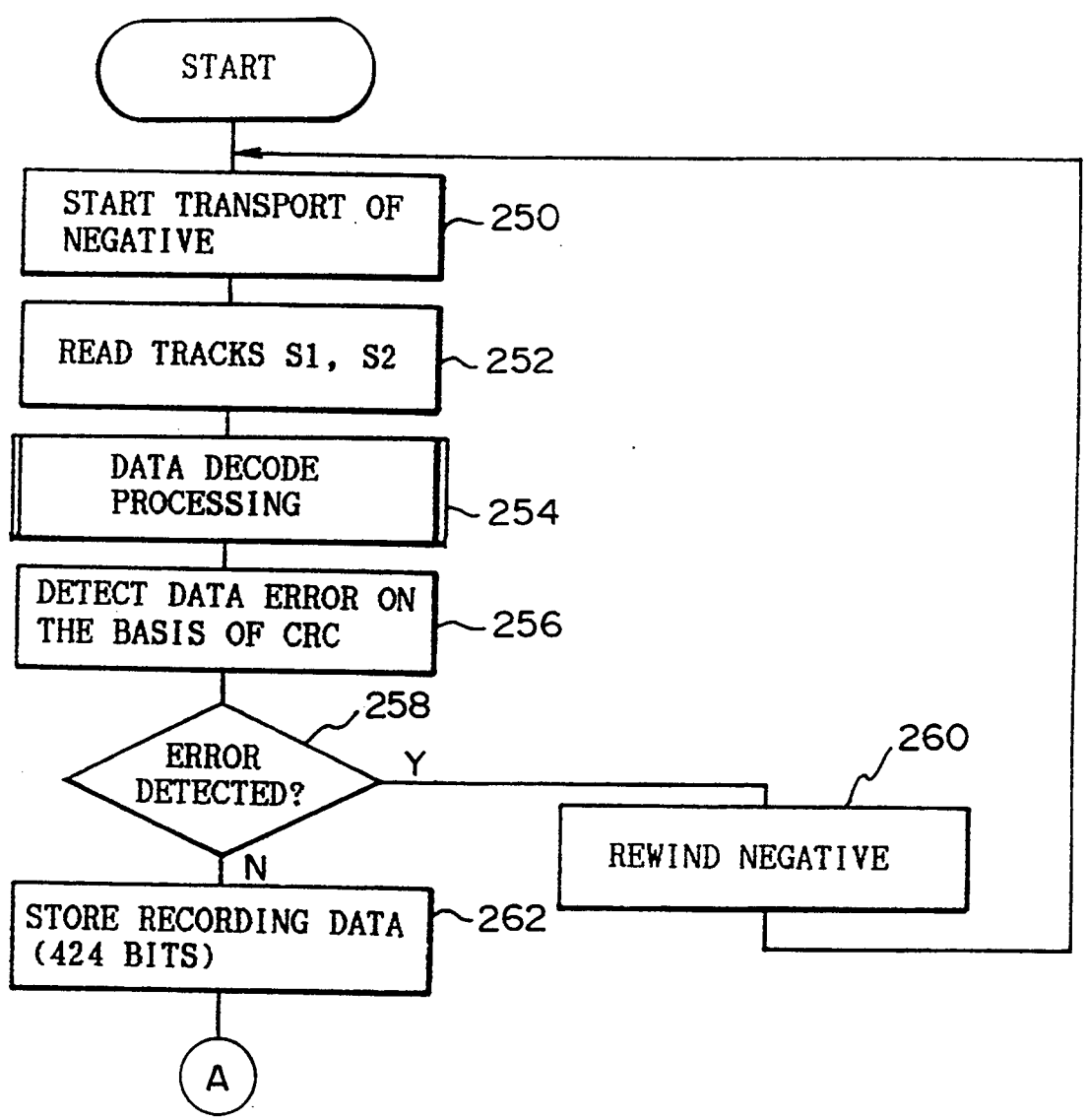
FIGS. 14A and 14B are flowcharts illustrating another example of processing for information reading and printing in the photographic printer.
Figure 14B:
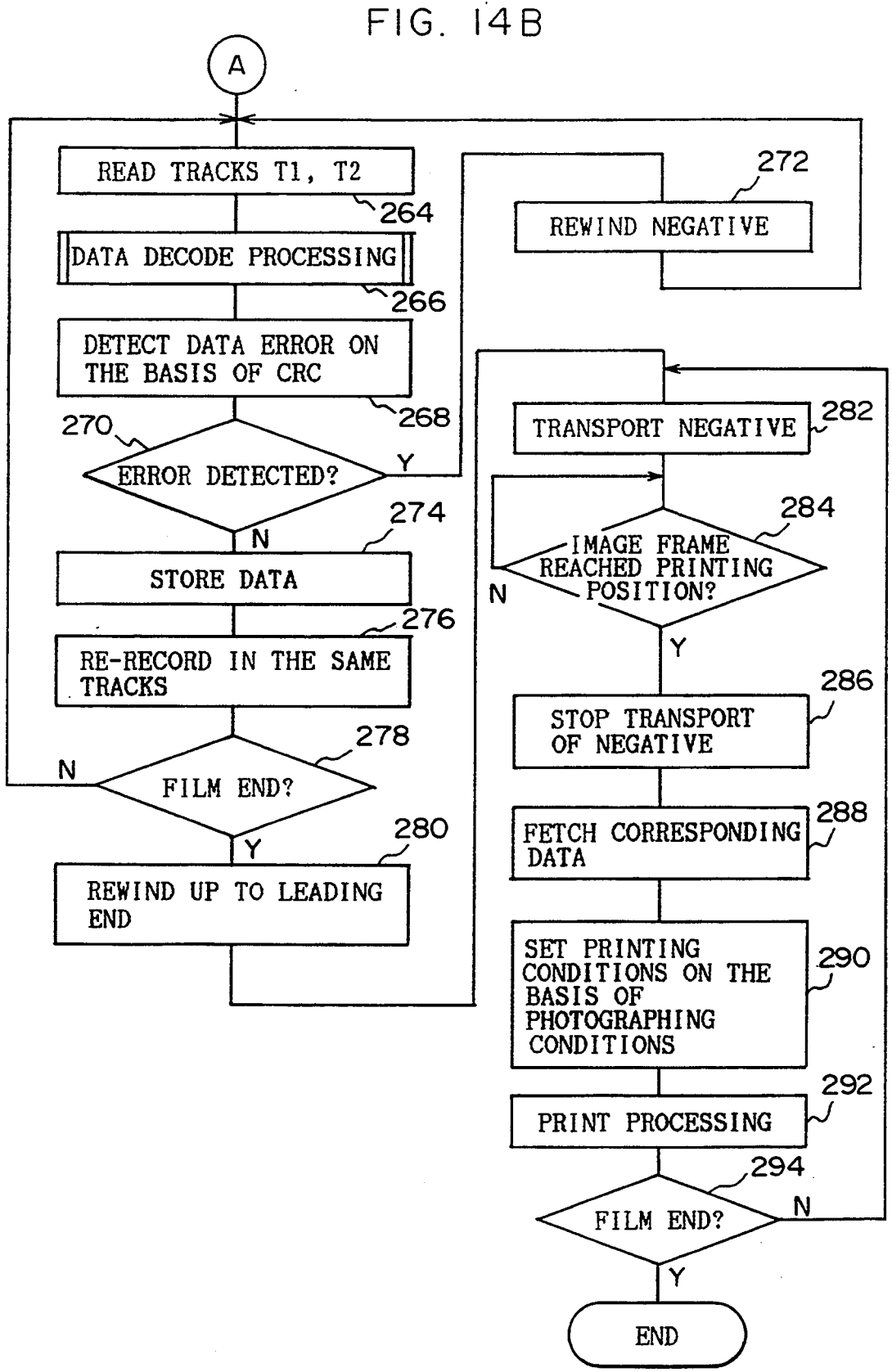

In the flowchart of FIG. 14, the reading and storage of data recorded in the tracks S1 and S2 are effected in Steps 250 to 262. Then, in Steps 264 to 278, the reading, decoding, and storage of data recorded in the tracks T1 and T2, as well as the re-recording onto the same tracks T1 and T2, are effected with respect to the image frames with the negative film 10 being transported at a fixed speed.

Consequently, unless the data error is detected and YES is given as the answer in a determination in Step 270, the re-recording of data is effected with the negative film 10 being transported at a fixed speed starting with a leading end up to a trailing end thereof, so that the transport speed during data recording becomes more stable, and the possibility of a reading failure occurring in a later process is further reduced. When printing is effected, the negative film 10 is rewound up to the leading end thereof in Step 280, and in Steps 282 to 294 the following processing is consecutively performed: the positioning of each image frame at the printing position, the fetching of the corresponding data stored, the determination of the printing conditions, and print processing.

Figure 15:
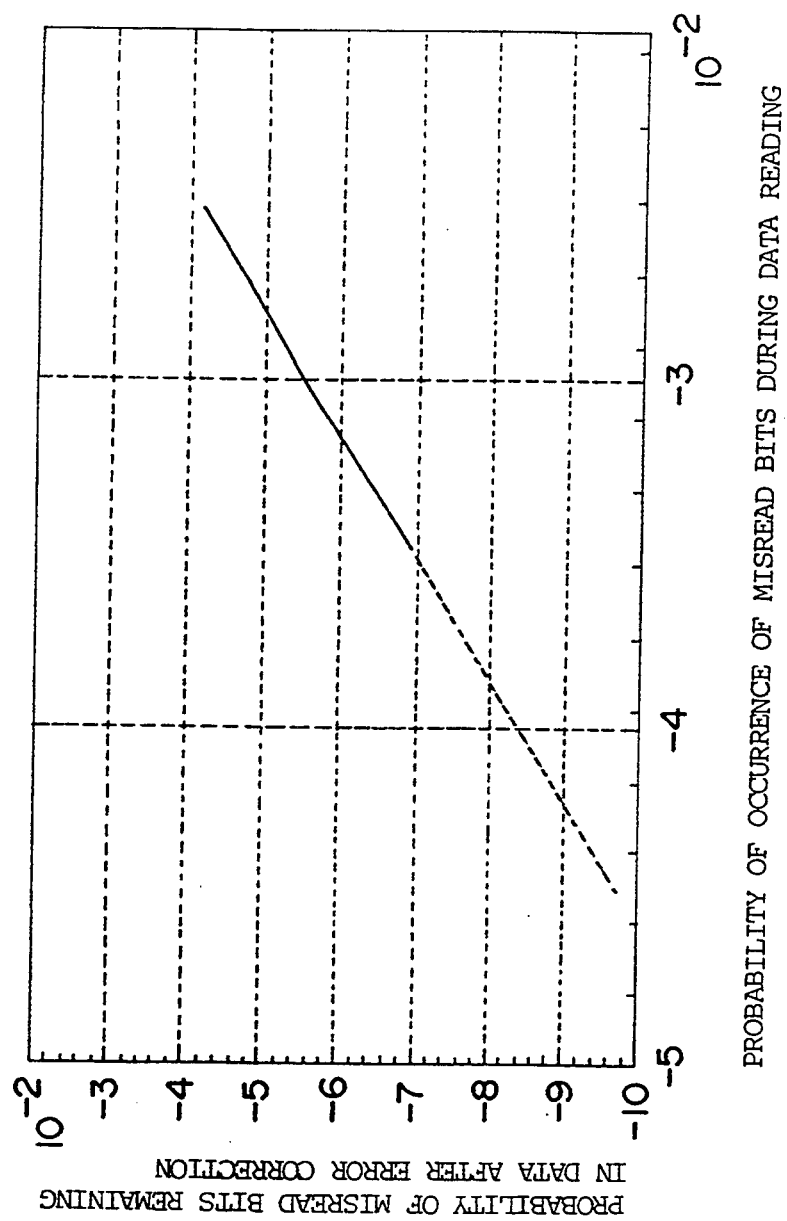
FIG. 15 is a diagram illustrating the relationship between the probability of occurrence of misread bits during data reading and the probability of misread bits remaining in the data after error correction in accordance with the present invention.

As described in the first and second embodiments, if error correction and detection are effected with respect to the information read by the photographic printer 60, on the basis of the error correction code and the error detection code added in the camera 50, the probability that the misread bits, which are read as values different from the original values, are included in the data is reduced substantially. FIG. 15 shows the relationship between the probability of occurrence of misread bits during data reading and the probability of misread bits remaining in the data after error correction. It is evident that the occurrence of misread bits is substantially reduced by the error correction in accordance with the present invention. Consequently, the probability of trouble occurring in the processing by the photographic printer 60 is correspondingly reduced by a remarkable degree.

Although, in the foregoing embodiments, an example has been shown in which the information recording apparatus is applied to the camera 50, and the information reading apparatus to the photographic printer 60, the present invention is not limited to the same. For instance, the present invention is applicable to respective apparatuses for effecting the recording and reading of information with respect to the tracks in the magnetic recording layer 16 in the process of photographic processing.

In addition, the arrangement provided in the foregoing embodiments is such that CRC is used as the error detection code, and the RS code as the error correction code, and the data is rearranged in accordance with the interleaving method. However, the present invention is not limited to the same, and a hamming code, a Fire code, a difference-set cyclic code, or the like may be used instead of the RS code.

Although, in the above-described embodiments, CRC as the error detection code and the RS code as the error correction code are added to the information to be recorded, and the information thus prepared is recorded in each track, recording may be effected by adding only either one of the two codes to the information.

What is claimed is:

1. An information recording apparatus comprising:
   means for performing a photographic process on a photographic film having a magnetic recording section thereon;
   adding means for adding to information to be recorded at least one of an error detection code for detecting an error in the information and an error correction code for correcting the error in the information; and
   recording means for recording in a magnetic recording section provided in a photographic film the information to which at least one of the error detection code and the error correction code is added by said adding means.

2. An information reading apparatus comprising:
   means for performing a photographic process on a photographic film having a magnetic recording section;
   reading means for reading information to which at least one of an error detection code for detecting an error in information and an error correction code for correcting the error in the information has been added, and which has been recorded in said magnetic recording section; and
   error detecting means for effecting at least one of the detection of an information reading failure and the correction of the error in the information on the basis of at least one of the error detection code and the error correction code added to the information which has been read by said reading means.

3. A method of recording and reading information, comprising the steps of:
   transporting a photographic film;
   recording, in a magnetic recording section of said photographic film, information to which at least one of an error detection code for detecting an error in information and an error correction code for correcting the error in the information has been added;
   reading the information which has been recorded in said magnetic recording section and to which at least one of the error detection code and the error correction code has been added, while the photographic film is being transported at a substantially fixed transport speed; and
   effecting at least one of the detection of the error in the information which has been read and the correction of the error on the basis of at least one of the error detection code and the error correction code.

4. A method of recording and reading information according to claim 3, further comprising the step of:
   recording again in said magnetic recording section the information subjected to at least one of the error detection and the error correction or information obtained on the basis of that information, while the photographic film is being transported at a substantially fixed transport speed.

5. A method of recording and reading information, comprising the steps of:
   transporting a photographic film through a camera;
   recording, in a magnetic recording section of said photographic film, information to which at least one of an error detection code for detecting an error in information and an error correction code for correcting the error in the information has been added;
   reading the information which has been recorded in said magnetic recording section and to which at least one of the error detection code and the error correction code has been added, while the photographic film is being transported at a substantially fixed transport speed in a photographic processor;
   effecting at least one of the detection of the error in the information which has been read and the correction of the error on basis of at least one of the error detection code and the error correction code; and
   recording again in said magnetic recording section the information which has been subjected to at least one of the error detection and the error correction or information which has been obtained on the basis of that information, while the photographic film is being transported at a substantially fixed transport speed in said photographic processor.

6. An information recording method for a photographic camera, comprising the steps of:
   transporting photographic film through said camera;
   recording, in a predetermined binary format during said transporting step, data relating to photography;
   dividing the data by a predetermined polynomial to determine a remainder;
   appending the remainder to the data to yield error checked data;
   dividing the error checked data into a plurality of data groups;
   determining an RS code, said determining step comprising the steps of:
   converting each of said data groups into Galois group data;

multiplying the Galois group data by a predetermined generator matrix to obtain galois group encoded data;

converting the galois group encoded data into binary encoded data; and using at least a portion of the binary encoded data as the RS code;

appending the RS code to the end of each of the data groups to obtain error corrected data groups; and interleaving individual bits of the error corrected data groups to obtain a plurality of rows of interleaved data; and recording the interleaved data on a recording portion of the photographic film.

7. An information recording and reproduction method for a photographic apparatus, comprising the steps of:

transporting photographic film through a camera;

recording, in a predetermined binary format during said transporting step, data relating to photography;

dividing the data by a predetermined polynomial to determine a remainder;

appending the remainder to the data to yield error checked data;

dividing the error checked data into a plurality of data groups;

determining an RS code, said determining step comprising the steps of:

converting each of said data groups into Galois group data;

multiplying the Galois group data by a predetermined generator matrix to obtain galois group encoded data;

converting the galois group encoded data into binary encoded data; and using at least a portion of the binary encoded data as the RS code;

appending the RS code to the end of each of the data groups to obtain error corrected data groups; and interleaving individual bits of the error corrected data groups to obtain a plurality of rows of interleaved data;

recording the interleaved data on a recording portion of the film;

reading the interleaved data with a reading device of a photographic processing apparatus;

deinterleaving the interleaved data according to a method which is the reverse of the method used in said interleaving step to obtain read data;

arranging the read data in consecutive bits in a memory to form a data train of the galois group data;

multiplying the Galois group data by a predetermined check matrix to detect whether there is an error in said data train;

removing the RS codes from the data train if no errors are detected in said detecting step;

determining the number of errors detected if errors are detected in said detecting step;

determining the position and magnitude of each error of errors are detected in said detecting step;

correcting the errors if errors are detected in said detecting step; and removing the RS codes from the corrected data if errors are detected in said detecting step.

8. An information recording method for a photographic camera, comprising the steps of:

transporting a recording medium;

recording data in a predetermined binary format during said transporting step;

dividing the data by a predetermined polynomial to determine a remainder;

appending the remainder to the data to yield error checked data;

dividing the error checked data into a plurality of data groups;

determining an RS code, said determining step comprising the steps of:

converting each of said data groups into Galois group data;

multiplying the Galois group data by a predetermined generator matrix to obtain galois group encoded data;

converting the galois group encoded data into binary encoded data; and using at least a portion of the binary encoded data as the RS code;

appending the RS code to the end of each of the data groups to obtain error corrected data groups; and interleaving individual bits of the error corrected data groups to obtain a plurality of rows of interleaved data; and recording the interleaved data on the recording medium.

9. An information recording and reproduction method for a photographic apparatus, comprising the steps of:

transporting a recording medium;

recording data in a predetermined binary format during said transporting step;

dividing the data by a predetermined polynomial to determine a remainder;

appending the remainder to the data to yield error checked data;

dividing the error checked data into a plurality of data groups;

determining an RS code, said determining step comprising the steps of:

converting each of said data groups into Galois group data;

multiplying the Galois group data by a predetermined generator matrix to obtain galois group encoded data;

converting the galois group encoded data into binary encoded data; and using at least a portion of the binary encoded data as the RS code;

appending the RS code to the end of each of the data groups to obtain error corrected data groups; and interleaving individual bits of the error corrected data groups to obtain a plurality of rows of interleaved data;

recording the interleaved data on the recording medium;

reading the interleaved data with a reading device of a photographic processing apparatus;

deinterleaving the interleaved data according to a method which is the reverse of the method used in said interleaving step to obtain read data;

arranging the read data in consecutive bits in a memory to form a data train of the galois group data;

multiplying the Galois group data by a predetermined check matrix to detect whether there is an error in said data train;

removing the RS codes from the data train if no errors are detected in said detecting step;

determining the number of errors detected if errors are detected in said detecting step;

determining the position and magnitude of each error of errors are detected in said detecting step;

correcting the errors if errors are detected in said detecting step; and removing the RS codes from the corrected data if errors are detected in said detecting step.

* * * * *